United States Patent [19]

Michiguchi et al.

[11] Patent Number: 4,706,031

[45] Date of Patent: Nov. 10, 1987

[54] METHOD AND SYSTEM FOR DETECTING AN OBJECT WITH A RADIO WAVE

[75] Inventors: Yoshihiro Michiguchi, Ibaraki; Fuminobu Takahashi, Katsuta; Kazuo Hiramoto, Hitachi; Masatsugu Nishi, Katsuta; Shinji Sonoda, Hitachi, all of Japan

[73] Assignee: Hitachi, Ltd., Tokyo, Japan

[21] Appl. No.: 718,390

[22] Filed: Apr. 1, 1985

[30] Foreign Application Priority Data

Mar. 30, 1984 [JP] Japan .................................. 59-65013

[51] Int. Cl.[4] .............................................. G01V 3/12
[52] U.S. Cl. .................................... 324/337; 324/326; 342/22
[58] Field of Search ............... 324/330, 332, 334, 337, 324/338, 344, 233, 58.5 B; 343/719, 459; 250/222.1; 342/22, 127, 27, 55, 118, 123, 124, 177, 179, 181

[56] References Cited

U.S. PATENT DOCUMENTS

| | | | |
|---|---|---|---|
| 2,657,380 | 10/1953 | Donaldson | 324/337 X |
| 2,919,397 | 12/1959 | Morley | 324/334 |
| 2,931,973 | 9/1960 | Puranen | 324/334 |
| 3,155,972 | 11/1964 | Boyer | 342/127 |
| 3,165,739 | 1/1965 | Long et al. | 342/127 X |
| 3,333,266 | 7/1967 | Kern | 342/127 |
| 3,775,765 | 11/1973 | Di Piazza et al. | 343/7 A X |
| 3,831,173 | 8/1974 | Lerner | 324/337 X |
| 3,836,960 | 9/1974 | Gehman et al. | 324/337 X |
| 3,911,435 | 10/1975 | Mardon et al. | 324/344 X |
| 3,967,282 | 6/1976 | Young et al. | 324/337 X |
| 4,006,481 | 2/1977 | Young et al. | 324/337 X |
| 4,070,612 | 1/1978 | McNeill et al. | 324/334 |
| 4,072,942 | 2/1978 | Alongi | 324/337 X |
| 4,352,105 | 9/1982 | Harney | 340/703 X |
| 4,368,641 | 1/1983 | McLeod, Jr. | 324/58.5 B X |
| 4,381,544 | 4/1983 | Stamm | 324/337 X |
| 4,593,246 | 6/1986 | Hill | 324/58 B X |

FOREIGN PATENT DOCUMENTS

| | | | |
|---|---|---|---|
| 147829 | 7/1985 | European Pat. Off. . | |
| 156879 | 12/1980 | Japan | 342/22 |
| 140661 | 8/1983 | Japan | 342/127 |
| 58-247689 | 12/1983 | Japan . | |
| 99385 | 6/1984 | Japan | 324/337 |

OTHER PUBLICATIONS

Suzuki et al, "Underground Radar System" (Research Report), *Shingakugiho*, vol. 79, No. 220, Jan. 25, 1980, pp. 21-28.

*Primary Examiner*—Reinhard J. Eisenzopf
*Assistant Examiner*—Warren S. Edmonds
*Attorney, Agent, or Firm*—Antonelli, Terry & Wands

[57] ABSTRACT

Method and apparatus for detecting an object by using a radio wave which is radiated by an antenna toward the object to be detected. An echo wave of the radio wave reflected from the object is received by the antenna. On the basis of phase difference between the transmitted waveform and the received waveform, material of the object is discriminatively identified. The object is displayed as an image on a display unit.

12 Claims, 33 Drawing Figures

METHOD AND SYSTEM FOR DETECTING AN OBJECT WITH A RADIO WAVE

BACKGROUND OF THE INVENTION

The present invention generally relates to a method of detecting a physical object by employing a radio wave and an apparatus for carrying out the method. More particularly, the invention concerns an object detecting method and system suited for identifying a position or location, shape or configuration and material of an object buried in the earth, although application of the invention is not restricted thereto.

In connection with the detection of an object by using a radio wave, there is a method shown in Japanese Patent Application No. 247689/1983 filed Dec. 29, 1983 under the title "RADAR SYSTEM" (not yet laid open) and a corresponding U.S. application Ser. No. 687,862 filed on Dec. 31, 1984 under the title "RADAR APPARATUS" and a paper titled "UNDERGROUND RADAR SYSTEM" SANE 79-40, reported on Jan. 25, 1980, "Technical Report of IECE in Japan", which document is an elucidation of the technology described in the patent applications mentioned above. The block diagram of the system of the prior Japanese Patent Application is illustrated in FIG. 1 of the accompanying drawings.

Referring to FIG. 1, an oscillator 3 oscillates at a very high frequency, whose output energy is radiated toward the ground or earth from an antenna 2 through a transmission/reception selector 4 in the form of a pulse-shape radio wave. The echo signal from a buried target object 1 is received by the antenna 2 and supplied through the transmission/reception selector 4 to a display device 9 after having been amplified by an amplifier 5. A controller 10 memorizes a time point at which the radio wave was transmitted and compares it with a time point at which the echo signal was received, to produce a time difference signal on the basis of which the time taken for the traveling of radio wave is arithmetically determined. Further, the controller 10 operates to determine a position on the display device 9 at which the received signal is to be displayed in dependence on the aforementioned time difference or interval between the transmission of the radio wave and the reception of the echo, to therby display the buried object 1 on the display unit 9. According to this method, the position of the buried object in the direction depthwise is arithmetically determined on the basis of the aforementioned time difference and the velocity of propagation of radio wave in the ground. Obviously, the propagation velocity of radio wave varies in dependence on the types of media through which the radio wave propagate. Accordingly, when the velocity of propagation in concern can not be definitely determined through a single cycle of measurement, the time difference is measured for a plurality of times by changing the position of the antenna, whereby the velocity of propagation is determined on the basis of data resulted from the plural measurement. On the other hand, for determining the position of the buried object in the horizontal direction, the antenna 2 is moved to measure the intensity of the echo (reflected radio wave) at various discrete positions of the antenna to determine a horizontal distribution of the echo intensity. Then, the horizontal position of the buried object can be estimated on the basis of the position at which the intensity of echo signal is at maximum.

For the buried or underground object to be detected, there may be mentioned, for example, water-service pipes, gas-supply pipes and others. In this connection, it is noted that the underground pipe or tube is not always made of steel but may be made of other material such as vinyl chloride in dependence on the intended applications. Under the circumstance, in order to determine the position of a particular buried pipe or tube such as a gas-supply pipe, it is indispensably important to detect the material constituting the pipe. Further, the discriminative identification of the objects reflecting the radio wave is important in view of the fact that there may exist under the ground not only the buried pipes such as gas-supply pipe but also rocks, water of pit produced due to leakage of damaged water-service pipes, cavity due to gas leakage, archaeological remains or vestiges, dangerous objects such as unexploded shells and other. In order to identify discriminatively only the aimed buried target object among the various the other buried objects such as those mentioned above, it is necessary to identify discriminatively both the shape or form and the material of the target object.

Heretofore, in conjunction with the identification of the object reflecting the radio wave, there has been adopted a method of examining or checking the difference in the intensity of echo. The concept of this method is based on the fact that, in case that objects in concern are made of plastic (or air) and a metal, respectively and they are located at the same position and have a same shape or configuration, the difference in the intensity of echoes from these objects are about 20 dB. This method can thus be adopted for identifying discriminatively the material of buried objects having a same outer diameter or contour, but suffers a drawback that the method can not be adopted in case the objects in concern differ in respect to the outer diameter and/or the shape.

The buried pipe detecting apparatus known heretofore is capable of displaying the results of the underground investigation in terms of visual information. In that case, when clutter echoes produced by underground rocks and/or cavities are simultaneously displayed as the visual information, the displayed picture will become very complex, to make it difficult to distinguish the requisite information from the unwanted information because the former is covered by the latter. Accordingly, it is also important for the visual display to eliminate the unwanted signals (hereinafter also referred to as the clutter noise) from the reflected wave, to thereby allow only the useful information to be extracted for the processing.

SUMMARY OF THE INVENTION

An object of the present invention is to provide a method of identifying accurately a target object located in the ground, in the air or under the water with respect to the position, shape and material thereof by employing a radio wave as well as an apparatus for carrying out the method.

A further object of the present invention is to provide a target object detecting method which is capable of displaying clearly and accurately the position and the material of an object in concern in term of visual information on the basis of the echo signal produced by the object as well as an apparatus for carrying out the method.

In view of the above and other objects which will be more apparent as description proceeds, it is proposed according to an aspect of the present invention that a radio wave is emitted in the direction toward an object to be detected an, echo from the object is received, and that a deviation in phase (also referred to as phase deviation) between the emitted radio wave and the echo radio wave is detected to determine whether the object is electrically conductive or nonconductive or to detect electrical characteristics of the object. According to another aspect of the invention, the intensity of the echo wave is also detected in parallel with the detection of the phase deviation to control an image to be displayed in dependence on the detected intensity of the echo. According to a further aspect of the invention, a plurality of radio waves of different frequencies are transmitted, wherein difference in the phase deviation between the echoes of different frequencies reflected by the object in concern is detected to identify the material of the object, which material is displayed as visual information. According to still another aspect of the invention, radio waves are emitted toward an object to be detected from a plurality of different positions, wherein echoes of these radio waves are received to display an image representative of the outer contour or profile of the object.

BRIEF DESCRIPTION OF THE DRAWINGS

FIG. 20 (a) is an intra-frame enlarged view of FIG. 20;

FIG. 20 (b) is a view showing an example of a display generated through the procedure illustrated in FIG. 20;

FIG. 20 (c) is a view illustrating another image plotting procedure;

FIG. 20 (d) is a view showing an example of an image generated through the procedure illustrated in FIG. 20 (c);

DESCRIPTION OF THE PREFERRED EMBODIMENTS

Figure 1:
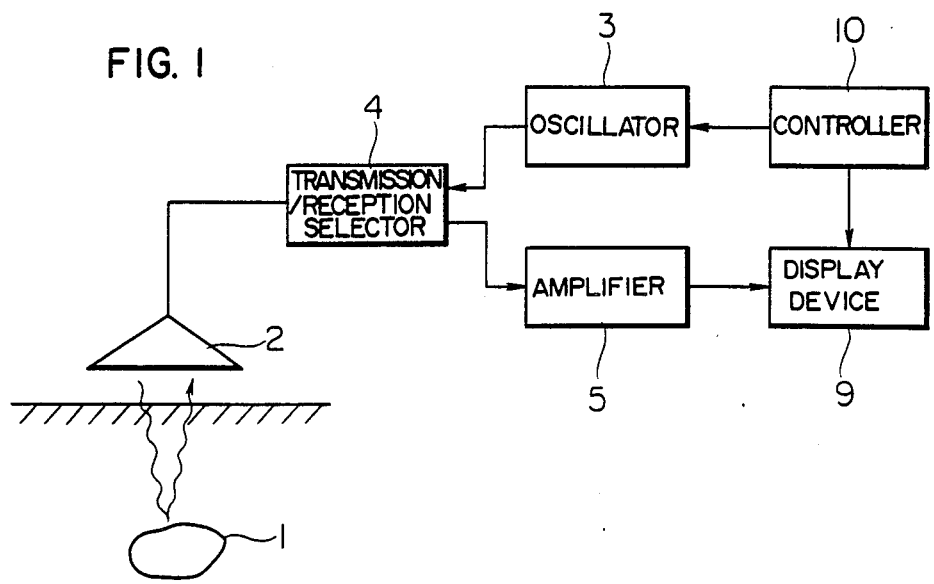
FIG. 1 is a block diagram showing schematically an arrangement of a buried object detecting apparatus.
Figure 2:
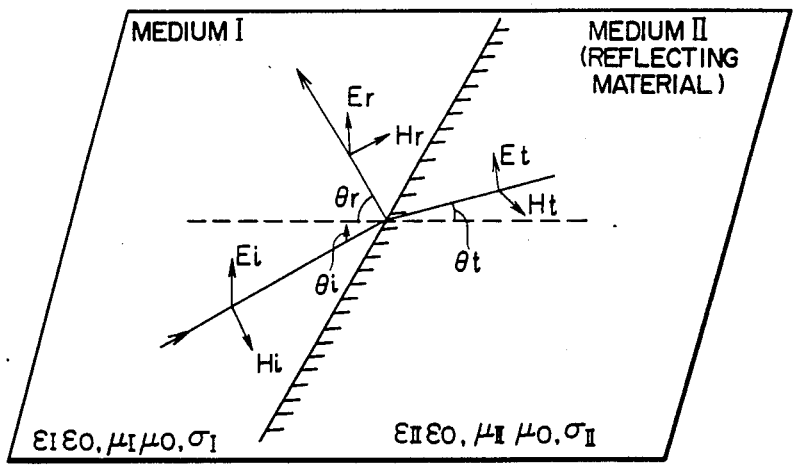
FIG. 2 is a view showing a relation of a phase between an incident radio wave and a reflected radio wave (echo) for illustrating the principle of the present invention.
Figure 3:
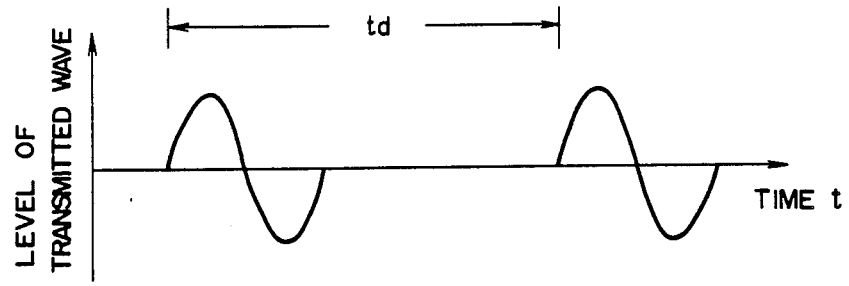
FIG. 3 is a view for illustrating transmission and reception of a radio wave.

Before entering into description of the exemplary embodiments of the present invention, the principle of the method of detecting an object will first be elucidated by referring to FIGS. 2 and 3.

Referring to FIG. 2, it is assumed that a linearly polarized electromagnetic wave (radio wave) propagates through a medium I and undergoes reflection at a boundary between media I and II and that the incident electro-magnetic wave has an electric field component $E_i$ which is perpendicular to the plane of incidence. Further, permittivities, permeabilities and conductivities of the media I and II are represented by $\epsilon_I$, $\epsilon_{II}$, $\mu_I$, $\mu_{II}$ $\sigma_I$, $\sigma_{II}$, respectively, while angles of the incident wave, reflected wave and the transmitting wave to the plane of reflection are represented by $\theta_i$, $\theta_r$ and $\theta_t$, respectively. Further, an electric field and magnetic field of the incident wave are represented by $E_i$ and $H_i$, respectively, while those of the reflected wave are represented by $E_r$ and $H_r$ with those of the transmitting wave being represented by $E_t$ and $H_t$, respectively. On the conditions, from the continuity of tangential components of the electric field and magnetic field on the plane of reflection, the following expressions can be derived:

$$E_i + E_r = E_t \tag{1}$$

$$\frac{k_I}{\mu_I}(E_i\cos\theta_i - E_r\cos\theta_r) = \frac{k_{II}}{\mu_{II}} E_t\cos\theta_t \tag{2}$$

When the wave numbers in the media I and II are represented by $k_I$ and $k_{II}$, respectively, the relation between the reflected wave $E_r$ and the incident wave $E_i$ can be expressed from the expressions (1) and (2) as follows:

$$E_r = \frac{\mu_{II}k_I\cos\theta_i - \mu_I\sqrt{k_{II}^2 - k_I^2\sin^2\theta_i}}{\mu_{II}k_I\cos\theta_i + \mu_I\sqrt{k_{II}^2 - k_I^2\sin^2\theta_i}} E_i \tag{3}$$

The wave number k of the electromagnetic wave of an angular frequency $\omega$ which propagates through a medium having permittivities $\epsilon\epsilon_0$ (where $\epsilon$ represents specific inductive capacity and $\epsilon_0$ represents permittivity of vacuum), permeabilities $\mu\mu_0$ (where $\mu$ represents specific permeability and $\mu_0$ represents permeability of vacuum) and conductivity $\sigma$ can be derived from the Maxwell's equation as follows:

$$k = \sqrt{j\omega\mu\mu_0(\sigma + j\omega\epsilon\epsilon_0)} \tag{4}$$

where j represents an imaginary unit.

Since the condition for the antenna being capable of receiving the reflected wave or echo is that the angle of incidence $\theta_i$ shown in FIG. 2 is of a small value, description will first be made on the assumption that the angle of incidence $\theta_i$ is equal to zero. In that case, the expression (3) can be rewritten as follows:

$$E_r = \frac{\frac{k_I}{\mu_I} - \frac{k_{II}}{\mu_{II}}}{\frac{k_I}{\mu_I} + \frac{k_{II}}{\mu_{II}}} E_i \tag{5}$$

When the value of $E_r/E_i$ obtained from the expression (3) is represented by $Z = a + jb$ (where a and b represent real numbers), the reflected wave or echo leads in phase by arg (Z) relative to the incident wave. By way of example, in case $a > 0$ and $b = 0$, the echo is in common phase with the incident wave. In case $a < 0$ and $b = 0$, the reflected wave or echo is in inverse phase to the incident wave.

Upon investigation of an underground object, the medium I is earth which exhibits the specific permittivity $\epsilon_I$ of about 4 in the dried state while exhibiting $\epsilon_I$ of about 10 in the wetted state. Permiability $\mu_0$ of vacuum is $4\pi \times 10^{-7}$ H/m. Conductivity $\sigma$ of the earth is about $10^{-4}$ v/m in the dried state and about $10^{-2}$ v/m in the wetted state.

In conjunction with transmission and reception of an electromagnetic wave, it is noted that an antenna of larger size is required as the frequency of the radio wave becomes lower. Under the circumstance, a radio wave of a frequency of several MHz or higher is usually employed in the object detecting system. In case the frequency f of the radio wave is 100 MHz and the medium I is a dry earth, the following relation applies valid:

$$\sigma_I << \omega\epsilon_I\epsilon_0 \tag{5)'}$$

Accordingly, from the expression (4)

$$k_I = j2\omega\sqrt{\mu_0\epsilon_0} \tag{6}$$

Thus, $k_I/\mu_I$ of the expression (5) can be expressed as follows:

$$\frac{k_I}{\mu_I} = j2\omega\sqrt{\frac{\epsilon_0}{\mu_0}} \tag{7}$$

On the other hand, assuming that the reflecting medium II is iron, the permittivity $\epsilon_{II}$ of the medium II is substantially equal to $\epsilon_0$ (permittivity of vacuum) while the permeability $\mu_{II}$ thereof is about $300 \times \mu_0$. The conductivity $\sigma_{II}$ is about $10^7$ v/m and thus $\sigma_{II} >> \omega.\epsilon_{II}$. Accordingly, from the expression (4), $k_{II}$ is given by $$k_{II} = \sqrt{\tfrac{1}{2}\omega\mu_{II}\sigma_{II}} \cdot (1 + j) \tag{8}$$

Accordingly, $k_{II}/\mu_{II}$ included in the expression (5) is given by $$k_{II}/\mu_{II} = \sqrt{\frac{\omega\sigma_{II}}{2\mu_{II}}} \cdot (1 + j) \tag{9}$$

As will be seen from the comparison of the expression (7) with (9), $k_I/\mu_I$ given by the expression (7) is about $3.3 \times 10^6$ while $k_{II}/\mu_{II}$ given by the expression (9) is about $3.5 \times 10^9$. Accordingly, from the expression (5), $$\frac{E_r}{E_i} = -1 \tag{10}$$

The above expression tells that the echo is in opposite phase to the incident wave.

The opposite phase relation between the echo and the incident wave is attributable to the fact that the reflecting medium has extremely high conductivity. Accordingly, in case the medium II is of a material having high conductivity such as water, metals and the like, the expression (10) will apply valid. On the other hand, the phenomenon that the phase of echo is reversed relative to that of incident wave when the reflecting medium II is of metal, water or the like does not depend on the frequency of the radio wave.

In case the medium II is of an electrically nonconductive material or dielectric material exhibiting thus the conductivity $\sigma\delta 0$, the wave number $k_{II}$ is given by the following expression because the permeability is equal to that of vacuum ($\mu_0$).

$$k_{II} = j\omega\sqrt{\mu_0\epsilon_{II}\epsilon_0} \tag{11}$$

On the condition, from the expression (5), the reflected wave or echo $E_r$ is given by $$E_r = \frac{\sqrt{\frac{j\omega(\sigma_I + j\omega\epsilon_I\epsilon_0)}{\mu_0}} - j\omega\sqrt{\frac{\epsilon_{II}\epsilon_0}{\mu_0}}}{\sqrt{\frac{j\omega(\sigma_I + j\omega\epsilon_I\epsilon_0)}{\mu_0}} + j\omega\sqrt{\frac{\epsilon_{II}\epsilon_0}{\mu_0}}} E_i \qquad (12)$$

Accordingly, when $\omega.\epsilon_I.\epsilon_0 >> \sigma$, the echo $E_r$ can be expressed by $$E_r = \frac{\sqrt{\epsilon_I} - \sqrt{\epsilon_{II}}}{\sqrt{\epsilon_I} + \sqrt{\epsilon_{II}}} E_i \qquad (13)$$

It will thus be understood that the echo is in phase with the incident wave or in opposite phase to the latter in dependence on the relation between the specific permittivities of the media I and II. In case the reflecting medium is earth, the specific permittivity $\epsilon_I$ thereof is in a range of ca. 4 to ca. 10. In contrast, when the reflecting medium is air, $\epsilon_{II}$ is equal to 1 (one), resulting in that the echo is in phase with the incident wave. However, when the frequency of the radio wave is varied so that $\omega.\epsilon_I.\epsilon_0 \simeq \sigma_I$, $E_r/E_i$ assumes the form of a complex including an imaginary number, as will be seen from the expression (12), resulting in that a deviation in phase (i.e. $\theta \neq 0°$ or 180°) will take place between the echo and the incident wave. For example, in the case of dry earth where $\sigma_I \simeq 10^{-4}$ V/m and $\epsilon_I \simeq$ ca. 4, $E_r/E_i$ is given by $E_r/E_i = 0.35 - 0.18j$ provided that the radio wave has a frequency of 0.5 MHz. This means that the phase of the echo lags by 27° relative to that of the incident wave.

In the case of wetted earth where $\epsilon_{earth} \simeq 10$ and $\sigma \simeq 10^{-2}$ v/m, from the expression (5), $E_r/E_i = 0.666 - 0.156j$ when the frequency of radio wave is 10 MHz. This means that the phase of the echo lags by about 14° relative to that of the incident wave. In case the frequency of radio wave is 100 MHz, then $E_r/E_i = 0.523 - 0.032j$ which means that the phase of the echo approximates closely to that of the incident wave. It will understood from the above analyses that in case the reflecting medium is of an electrically nonconductive material, the deviation in phase between the incident wave and the reflected wave or echo is caused to vary by varying the frequency of the electromagnetic wave, even when the medium I is the earth in the wetted state.

Further, in case the reflecting medium is of a dielectric material such as polyethylene where the specific permittivity $\epsilon_{II}$ is in a range of about 2 to 10, the deviation in phase between the echo and the incident wave is caused to vary by varying the frequency of the radio wave similarly to the case where the reflecting medium is air.

By making use of the fact that the phase of the echo is reversed independent of the frequency of the radio wave when the reflecting medium is an electrically conductive material, it is possible to determine definitely whether the reflecting medium is an electrically conductive material or an electrically nonconductive material through phase-comparison of the incident wave and the echo by changing the frequency of the electromagnetic wave. In practical application of the object detecting system, when the radio wave is emitted toward an object under investigation from an antenna, there are present two echoes, i.e. one echo due to reflection of the radio wave at the medium I, e.g. the ground surface and an other echo due to reflection by the medium II, i.e. the object under investigation. However, the echo from the ground surface can be clearly discriminated from the echo produced by the target object in concern, because the former can be received at an earlier time point than the latter. Accordingly, description of the reflection at the ground surface will be unnecessary.

In the foregoing, it has been assumed that the electric field component of the radio wave is perpendicular to the plane of incidence, as shown in FIG. 2. It should however be noted that the relation between the incident wave $E_i$ and the echo $E_r$ given by the expression (5) applies valid even when the electric field component lies in the plane of incidence. Accordingly, it is possible to determine whether the medium reflecting the radio wave is electrically conductive or nonconductive, by comparing the phase of the incident wave with that of the echo.

Further, in case the radio wave is polarized elliptically or circularly, the principle of the invention can equally apply valid, because the electric field component can be represented by a sum of two linearly polarized waves which intersect perpendicularly to each other. This in turn means that the detecting system according to the invention is not restricted to the use of a linear antenna but an antenna of any given configuration can be employed.

In carrying out the detecting method according to the invention, a pulse-shape radio wave is made use of. In this connection, it should be mentioned that the pulse repetition period td shown in FIG. 3 must be selected longer than the time duration 2ld/v (where v is velocity of propagation) taken for the radio wave to reach a coverage limit ld in view of the necessity of determining arithmetically the distance to the reflecting medium, as in the case of a conventional radar system. Further, resolution in respect to the distance in the horizontal direction can be improved by using a directional antenna capable of radiating a radio wave beam at a reduced angle of divergence or by resorting to synthetic processing aperture. The principle of the present invention realized in combination with these features allows the object detecting performance or function to be enhanced significantly.

Further, it should be added that the concept of the present invention that determination as to whether the target object is electrically conductive or non-conductive is made on the basis of the phase comparison of the echo and the incident wave can be applied not only to the detection of the underground object but also to the detection of an object under the water or in the air. For example, let's assume that the ground surface is observed from above in the air by a radar system. In that case, the phase of the echo from the sea and the river is deviated by 180° relative to that of the incident wave independent of the frequency of the radiated wave, while the phase of echo from the ground varies in dependence on variation in the frequency. Accordingly, the concept of the present invention can be effectively applied to a radar system carried by an airplane or a space ship for discriminating the lands from the waters in daytime or nighttime without being influenced by temperature or the like factors.

Figure 4:
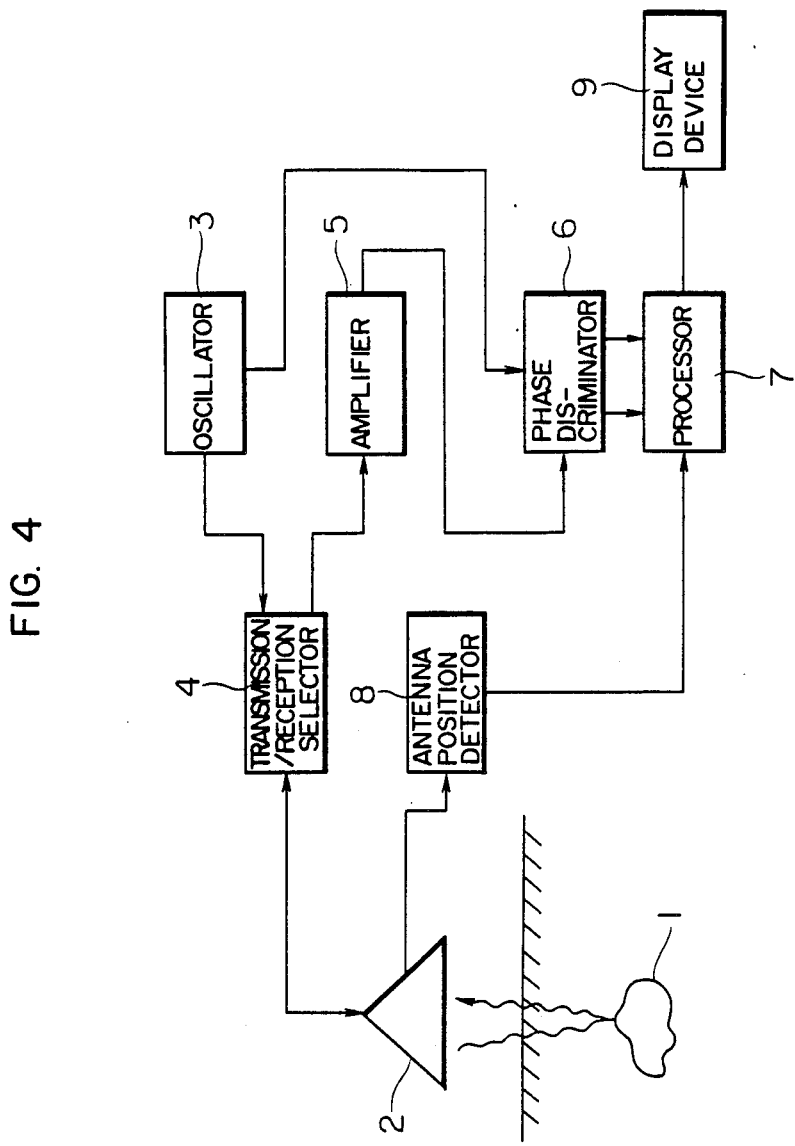
FIG. 4 shows schematically in a block diagram a basic arrangement of a buried object detecting apparatus according to the teaching of the present invention.
Figure 5:
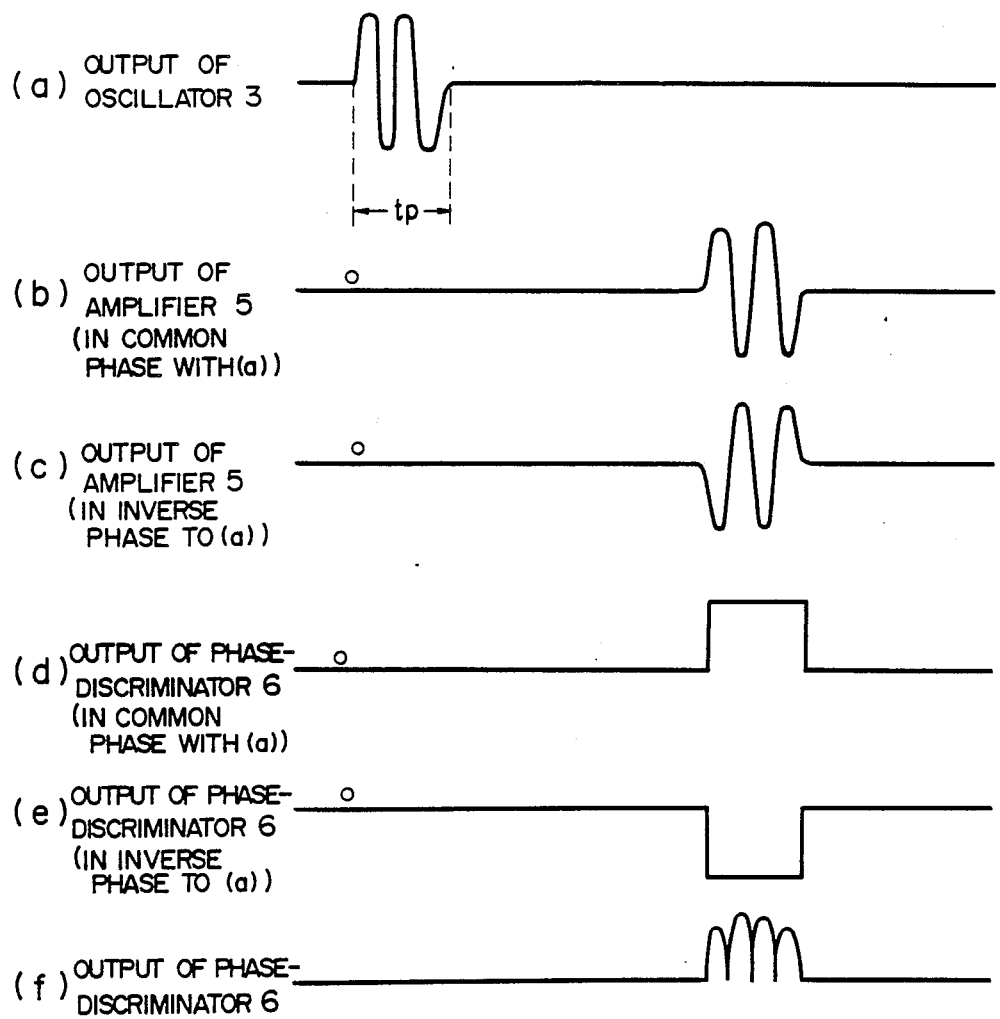
FIG. 5 is a diagram showing waveforms of signals produced by various circuits of the apparatus shown in FIG. 4.

How, the invention will be described in conjunction with a buried object detecting system according to a first embodiment of the invention. FIG. 4 shows a basic structure of the detecting system. In the figure, a reference numeral 1 denotes a buried target object. For detection, an electromagnetic wave is radiated from an antenna 2 and an echo is received. A numeral 3 denotes an oscillator for generating the radio wave frequency signal. A numeral 4 denotes a transmission/reception selector which may be conveniently constituted by a circulator. The signal generated by the oscillator 3 is fed to the antenna 2 by way of the transmission/ reception selector 4 and emitted as electromagnetic wave toward a burying medium such as the earth. The radio wave is reflected back by the buried object 1 and received by the antenna 2 as the echo. The echo signal caught by the antenna is supplied to an amplifier 5 by way of the transmission/reception selector 4. The echo signal amplified through the amplifier 5 is inputted to a phase discriminator 6, which is additionally supplied with a reference signal equivalent to the radio wave generated by the oscillator 3. The echo signal is thus compared with the reference signal by the phase discriminator 6 which then produces an output signal representative of the phase deviation or difference resulted from the comparison and additionally an output signal representative of intensity of the echo. These output signals of the phase discriminator 6 are supplied to a processor unit 7 which then performs signal processing in correspondence with the output signals of the phase discriminator 6 for displaying an image of the buried object 1 on a display unit 9. The processor unit 7 is also supplied with a signal outputted from an antenna position detecting unit 8 which is so arranged as to determine the distance over which the antenna is moved with reference to an initially set position. To this end, the detector 8 may be composed of a wheel which rotates on the ground surface as the antenna is moved and means for determining the distance of mevement of the antenna as a function of the revolution number fo the wheel. Of course, many other known devices may serve for the function of the antenna position detector 8. From the output signal of the antenna position detector 8, the processor unit 7 can derive the information about the position or location of the buried object 1. The results of the signal processings performed by the unit 7 are displayed on the display unit 9. FIG. 5 shows waveforms of the signal produced by the various units and devices shown in FIG. 5. As will be seen in FIG. 5 at (a), the output signal of the oscillator 3 in is of a pulse-modulated waveform in which the frequency of the pulse signal lies in a range of several tens MHz to several GHz. The time duration tp of the pulse wave is adjusted in dependence on the estimated distance to the buried object 1 and velocity of propagation in the medium. Generally, the time ty is in a range of 1 nano second to several tens nano seconds. Since the output of the oscillator 3 is radiated from the antenna 2, the waveform of the radio wave incident on the burying medium is the same as that of the output of the oscillator 3. The reflected radio wave or echo from the buried object is caught by the antenna 2 and amplified by the amplifier 5 whose output waveform is illustrated at (b) and (c) in FIG. 5. As will be seen, phase of the detection signal outputted from the amplifier 5 in response to the echo from the buried object of air or gas differs from that of the detection signal produced when the buried object is of a metal. Accordingly, decision is made as to whether the first echo is in phase with the incident wave or not. In the former case, the output signal of the phase discriminator 6 is a pulse signal .fo positive polarity, while in the latter case the output of the discriminator 6 is a pulse of negative polarity, as shown in FIG. 5 at (d) and (e), respectively. Additionally, a signal representative of the absolute value of the echo signal is also derived, as shown at (f) in FIG. 5. The function of the processing unit 7 is to process these signals to thereby produce an image or video signal. It will be understood that what is important in carrying out the invention is how to detect discriminatively the phase deviations corresponding to different types of the buried objects and how to process the results of detection for producing the image information. These important features will be made clear from the following detailed description of the phase discriminator 6 and the processing unit 7 implemented according to embodiments of the invention.

Figure 6:
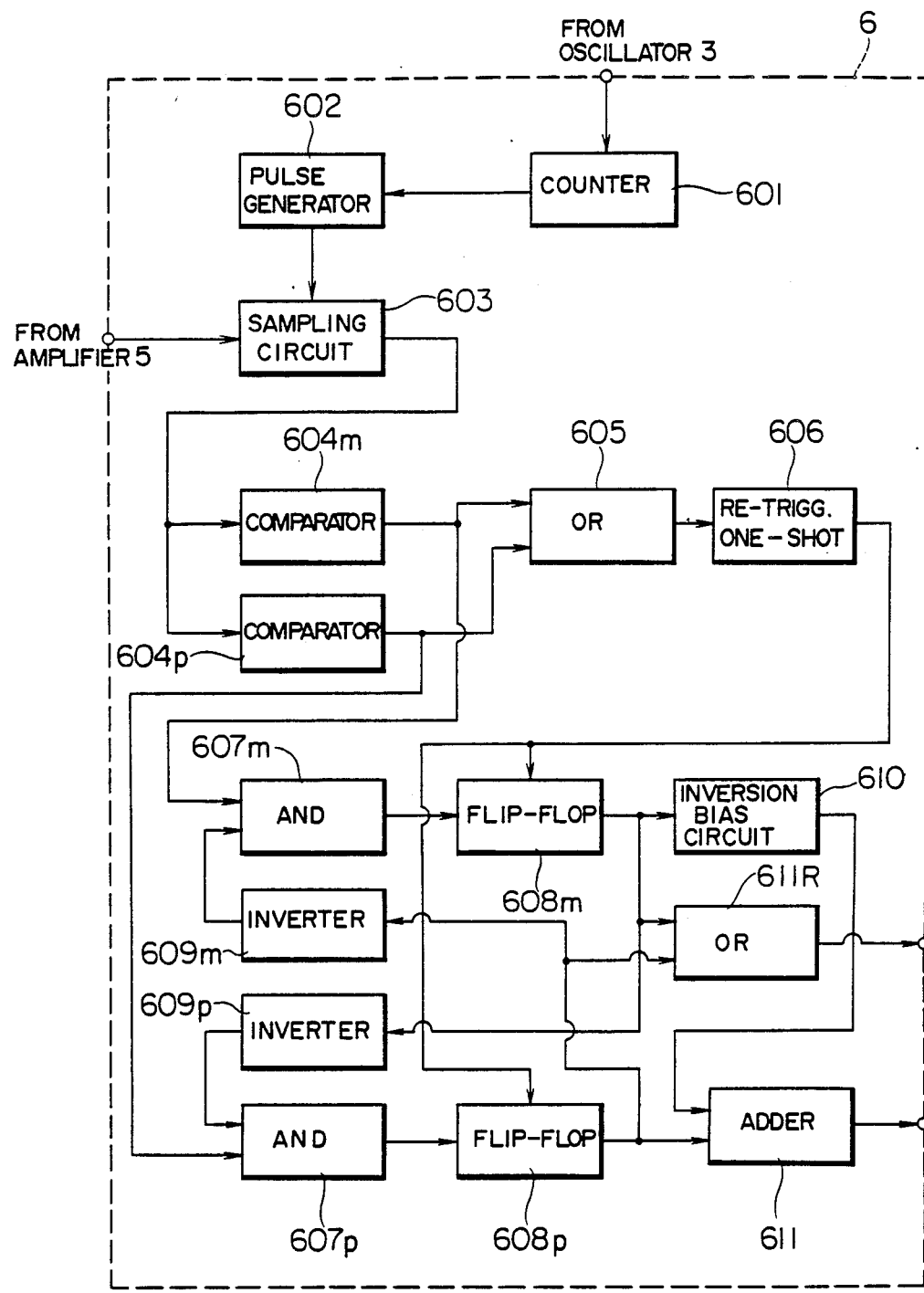
FIG. 6 is a block diagram showing a circuit configuration of a phase discriminator according to a first embodiment of the invention which can be employed in the object detecting apparatus shown in FIG. 4.
Figure 7:
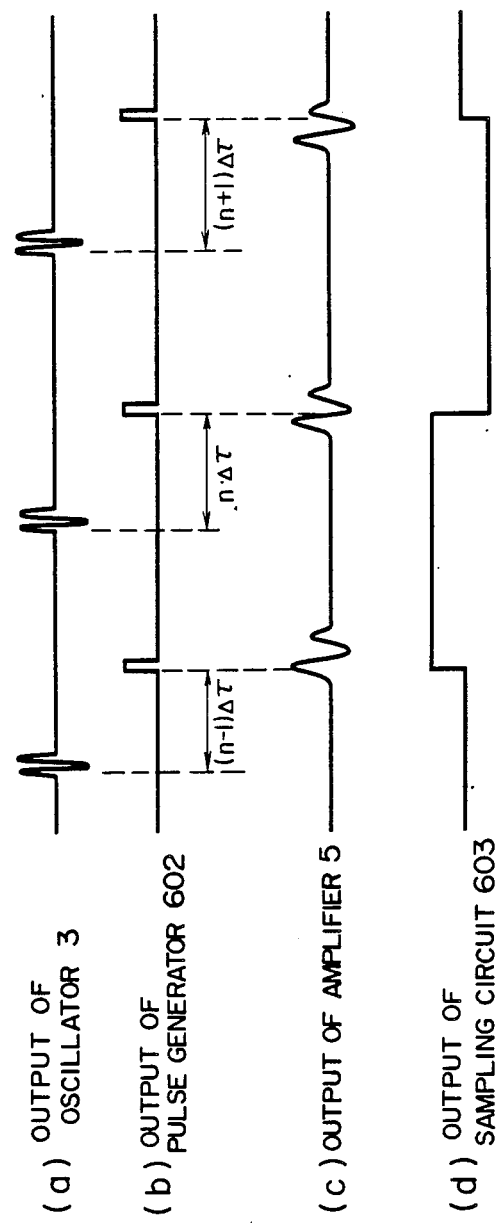
FIGS. 7 and 8 are signal diagrams illustrating waveforms of signals produced by various circuits consituting the phase discriminator shown in FIG. 6.
Figure 8:
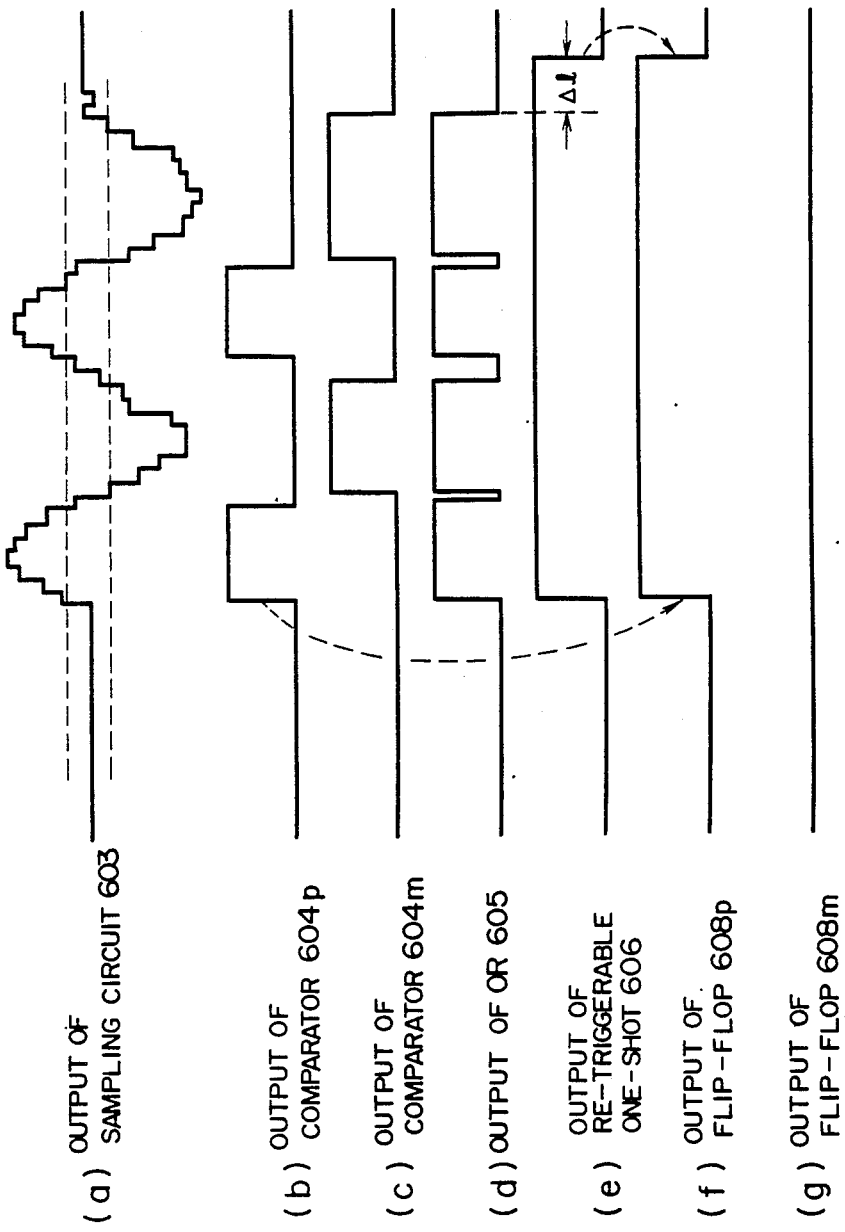

FIG. 6 is a view showing a circuit arrangement of the phase discriminator 6 according to a first embodiment of the invention. FIGS. 7 and 8 are diagrams for illustrating waveforms of signals produced by circuits constituting the phase discriminator 6. The following description make reference to FIGS. 6, 7 and 8. A reference numeral 601 denotes a counter circuit, and 602 denotes a pulse generator. The counter circuit 601 receives the output signal of the oscillator 3 and produces a count signal with delay of a predetermined time from the reception. The delay time can be controlled by the count value of the counter circuit 601. More specifically, the counter circuit 601 starts the counting operation in response to the application of the output signal from the oscillator 3 and produces the count pulse after lapse of the delay time Δt given by $$\Delta t = n.\Delta\tau$$

where n is a given integer representative of the number of times the oscillator produces the signal as counted from a given time point, and Δt represents an extremely short time corresponding to the count value of 1 (one). When the count value has attained (n+1), overflow occurs in the counter circuit 601 which is then reset to the count value of zero. Upon application of the count pulse to the pulse generator circuit 602 from the counter circuit 601, the pulse generator circuit 602 outputs a pulse signal with a delay of Δt relative to the appearance of the output signal from the oscillator 3, as is shown in FIG. 7 at (b). Under the timing of the output pulse signal from the pulse generator circuit 602, a sampling circuit 603 samples the output signal of the amplifier 5. More specifically, the interval between a given output signal of the oscillator 3 and the succeeding output signal thereof is divided by n, wherein the echo signal outputted from the amplifier 5 is sampled at each of n points. By virtue of this sampling operation, the time base of the echo waveform as obtained is expanded by a factor of n. More specifically, when the frequency of the original echo waveform is represented by F(Hz), the frequency fr of the echo [shown at (d) in FIG. 7 or at (a) in FIG. 8]obtained as the output signal of the sampling circuit 603 can be expressed as follows:

$$fr = F/n \text{ (Hz)}$$

Since F is in a range of several tens MHz to several GHz while n is around 200, fr lies in a range of several hundreds kHz to several tens MHz. In this manner, the echo signal shifted to a lower frequency region can be obtained from the output of the sampling circuit 603. A train of the echo signals obtained from the sampling circuit 603 is illustrated in FIG. 8 at (a). The phase discrimination is effected on the basis of this echo signal. It will be noted that the waveform shown at (a) in FIG. 8 corresponds to the waveform shown at (d) in FIG. 7, wherein the time base of FIG. 8 (a) is plotted elongated or expanded relative to the time axis of FIG. 7 (d). Referring to FIG. 6, reference letters 604m and 604p designate comparators, respectively. The comparator 604m is provided for processing the signal of negative polarity, while the comparator 604p serves for processing the signal of positive polarity. The comparison or reference levels of these comparators are, respectively, indicated by broken lines in FIG. 8 at (a). The outputs of the comparator 604p and 604m become high level when respective reference levels are exceed [refer to FIG. 8 at (b) and (c)]. The output signals of both comparators 604m and 604p are logically ORed by an OR gate 605. In other words, the output of the OR gate 605 becomes high when the output of either the comparator 604m or 604p is high, as shown in FIG. 8 at (d). A numeral 606 denotes a re-triggerable one-shot circuit whose output changes to high level in response to the rise-up edge (rising up from low to high level) of the output signal of the OR gate 605. The output of this one-shot circuit 606 drops to the low level after lapse of a preset time Δl from the changeover of the output of the OR gate 605 to the low level. By selecting the value of Δl to be about a half-wavelength of the output signal from the sampling circuit 603, the output signal of the re-triggerable one-shot circuit 606 is at high level only during the period in which the echo signal is present, as is shown in FIG. 8 at (e). Symbols 607m and 607p designate AND gates, respectively, 608m and 608p designate flip-flop elements, respectively, and 609m and 609p designate inverter elements, respectively. Each of the AND gates 607m and 607p has two inputs and produces high-level output when two inputs are simultaneously at high level. Consequently, by maintaining one of the inputs at low level, the output of the AND gate is rendered to be independent of the other input. In other words, the AND gate is set to the masked state. Now, operation of the circuit arrangement shown in FIG. 6 will be described by referring to the waveform diagram shown in FIG. 8. At first, consideration will be made on the assumption that no echo is present. On the condition, the outputs of the flip-flop elements 608m and 608p are both at low level, as the result of which the outputs of the inverter gates 609m and 609p are high level. As the consequence, the AND gate elements 607m and 607p are both in the state of readiness to output high level when the output levels of the comparators 604m and 604p become high. At this stage, it is assumed that the echo for which the signal of positive polarity is detected at an earlier time point as shown in FIG. 8 at (b) and (c) makes appearance. Then, the output signal of the comparator 604p is gated through the AND gate 607p to trigger the flip-flop element 608p whose output is then changed over to high level. As the consequence, the output of the inverter gate element 609m becomes low, resulting in that the output of the AND gate 607m remains at low level regardless of the output of the comparator 604m until the output of the flip-flop element 608p becomes low. In other words, even when the output of the comparator 604m changes to high level, the flip-flop element 608m remains untriggered with the output thereof also remaining low. This is because the output of the comparator 604m is masked by the output of the inverter gate element 609m. This masked state continues to exist until the flip-flop element 608p is triggered by the falling edge of the output of the re-triggerable one-shot circuit 606. The operation described above takes place when the echo wave of positive polarity is detected at an earlier time point. In contrast, when the echo wave of negative polarity is detected at an earlier time point, the flip-flop element 608p is set at high level, as the result of which the output of the inverter gate element 609p becomes low, whereby the output of the comparator 604p is masked. Consequently, the output of the flip-flop 608p remains unchanged at low level. As will now be appreciated, when the signal of positive polarity is detected at an earlier time point, the flip-flop element 608p produces the output of high level, while upon detection of the signal of negative polarity at an earlier time point, the flip-flop 608m produces output of high level. A reference numeral 610 denotes an inversion/bias circuit serving to invert the output of the flip-flop element 608m and additionally apply a bias. More specifically, the output of the inversion/bias circuit 610 is set to zero when the output of the flip-flop element 608m is at low level, while the circuit 610 produces a negative going output signal when the output of the flip-flop element 608m is at high level. A reference numeral 611 denotes an adder which serves for adding together the output of the inversion/bias circuit 610 and the output of the flip-flop element 608p. It never occurs that the outputs of both flip-flop elements 608m and 608p are simultaneously at high level. Further, due to the function of the inversion/bias circuit 610, the adder 611 produces an output signal of negative polarity when the output signal of the flip-flop element 608m is present, while the adder 611 produces the output signal of positive polarity when the flip-flop element 608p produces the output signal. As will now be appreciated, with the phase discriminator 6, the signal of positive polarity is derived when the echo is in phase with the incident wave, while the signal of negative polarity is obtained when the echo is in opposite phase to the incident wave, as illustrated in FIG. 5 at (d) and (e). A reference symbol 611R designates an OR logic element which produces output of high level when signal waveform makes appearance at the output of either the flip-flop 608m or the flip-flop 608p. The output of the OR logic element 611R is made use of by the processor unit 7 for producing the echo intensity signal. However, in the case of the instant embodiment, only the decision as to whether the echo is present or not can be performed, since the high level assumes a constant value. A method capable of deriving also the echo intensity information will be described hereinafter in conjunction with the third embodiment of the invention.

Figure 9:
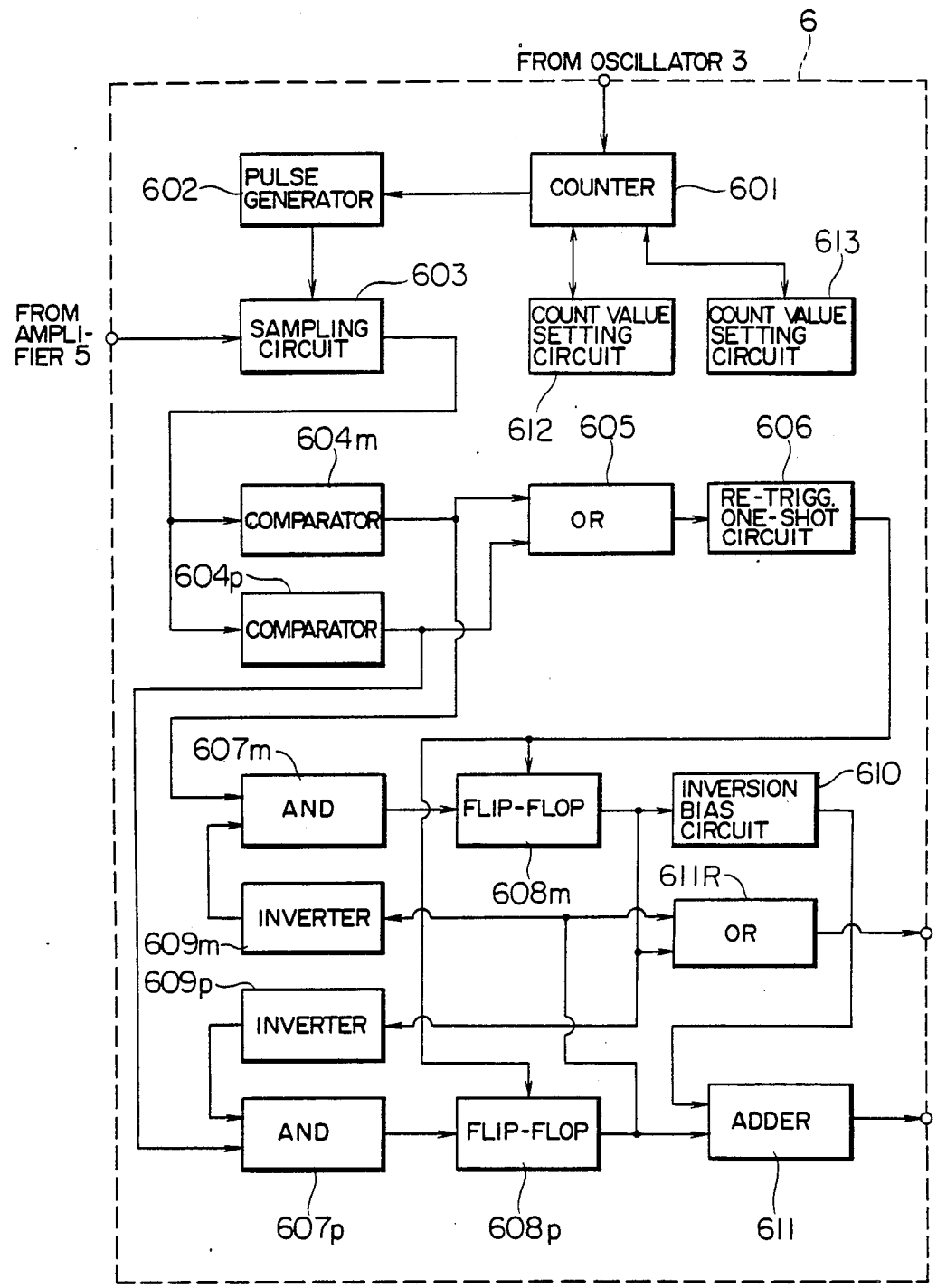
FIG. 9 is a block diagram showing a circuit configuration of the phase discriminator according to a second embodiment of the invention.
Figure 10:
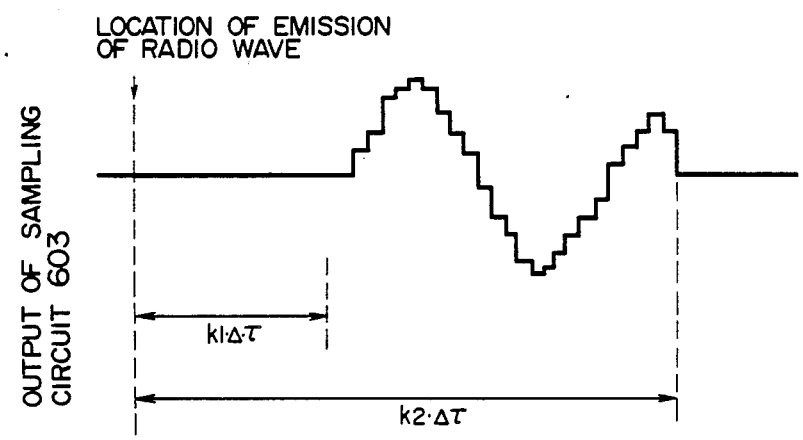
FIG. 10 is a view illustrating graphically an output signal of a sampling employed in the phase discriminator shown in FIG. 9.

Next, a second embodiment of the phase discriminator 6 according to the invention will be described in detail. FIG. 9 shows the circuit arrangement of the phase discriminator according to the second embodiment of the present invention. The instant embodiment is a version of the first embodiment described above and is characteristically featured by the gating function which permits the sampling of the echo signal only when the echo from an object under investigation is present. As will be seen in FIG. 9, the instant embodiment differs from the phase discriminator described above in that count value setting circuits 612 and 613 are additionally provided. With the count value setting circuit 612 and 613, it is possible to set any given integer value inclusive of 0 (zero). For example, it is assumed that the values to be set are $k_1$ and $k_2$ which define the lower and upper limit count values of the counter circuit 601. More specifically, the set value for the counter circuit 601 is so selected that the counting is effected so that the count is increased from $k_1$ to $k_2$. When the set value has attained $k_2$, overflow occurs in the counter circuit 601, wherein the set value $k_1$ is again loaded in the counter circuit 601. Accordingly, the delay time $\Delta t$ may assume a value in a range of $k_1 \Delta \tau$ to $k_2 \Delta \tau$. This is because the output of the sampling circuit 603 is of the waveform sampled during a period of $k_2 \Delta \tau - k_1 \Delta \tau$, is shown in FIG. 10, which means in the equivalent sense that the gating function is validated during this period. By virtue of this gating function, only the signal that makes appearance during a period in which the echo is present can be sampled, whereby the unwanted noise echo can be eliminated to allow only the echo reflected by the buried object under investigation to be extracted. In this way, a clear and sharp image of the buried object can be produced on the display unit. The starting time point $k_2 \Delta \tau$ and end time point $k_2 \Delta \tau$ of the gating period bear the following relations, respectively, to distance $L_1$ and Lhd 2. Namely, $$L_1 = k_1 \Delta \tau \cdot v/2$$

$$L_2 = k_2 \Delta \tau \cdot v/2$$

where v represents the velocity of propagation of the radio wave in the burying medium. Accordingly, in the case of the instant embodiment, detection is allowed in the range defined by difference between the distances L1 and L2. In other words, by varying the set values k1 and k2, it is possible to detect only the buried object that is located in the predetermined range of depth.

Figure 11:
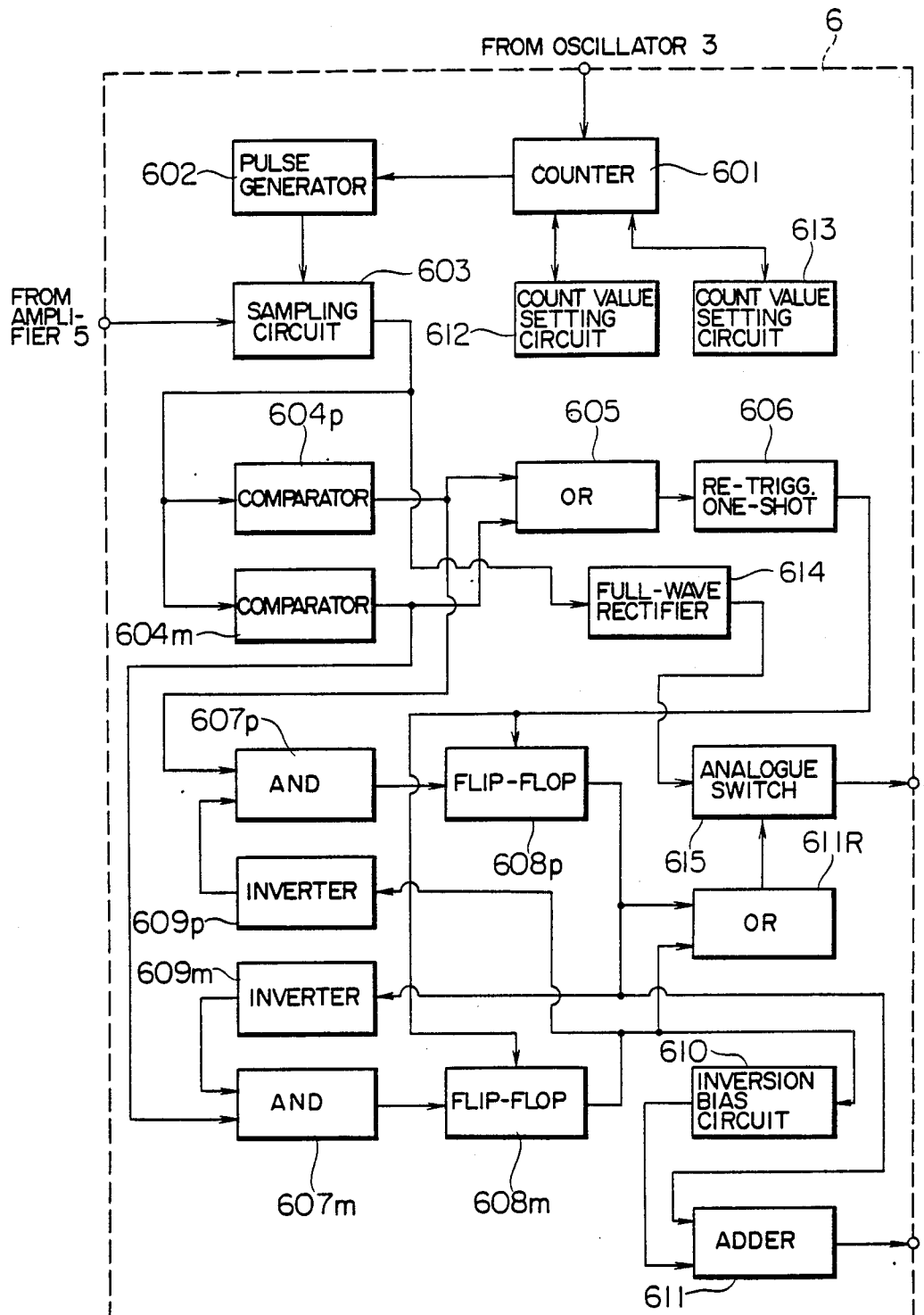
FIG. 11 shows in a block diagram a circuit arrangement of a phase discriminator according to a third embodiment of, the invention.
Figure 12:
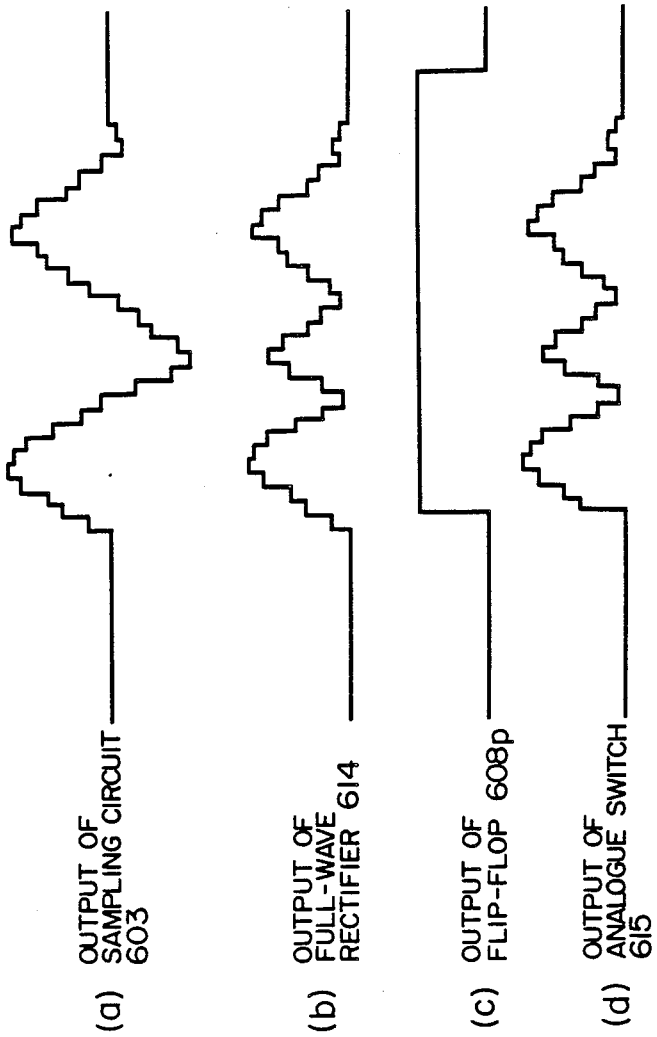
FIG. 12 is a diagram showing waveforms of signals produced by various circuits constituting parts of the phase discriminator shown in FIG. 11.

Next, description will be made of a third embodiment of the phase discriminator according to the present invention. FIG. 11 shows a circuit arrangement of the phase discriminator according to the third embodiment of the invention, and FIG. 12 illustrates signal waveforms produced by circuits constituting parts of the phase discriminator. This third embodiment differs from the first and second embodiments in that information of intensity of the echo is available in addition to the phase information of the echo. In the figure, a reference numeral 614 denotes a full-wave rectifier circuit for rectifying the output signal of the sampling circuit 603 which has the waveform corresponding to that of the echo. The output signal of the rectifier circuit 614 corresponds to the output signal of the sampling circuit 603 in which the negative portion is inverted, as is shown in FIG. 12 at (b). The output signal of the full-wave rectifier circuit 614 contains the information about the intensity of the echo signal. In the case of the instant embodiment, the output of the full-wave rectifier circuit 614 is supplied to an analogue switch element 615 which is turned on in response to the output of an OR gate element 611R indicative of the detection of echo. Now, it is assumed that the signal of positive polarity is detected at an earlier time point as shown in FIG. 12 at (a). On the assumption, the AND gate element 607m is masked, as elucidated hereinbefore in conjunction with the first and second embodiments, resulting in that the output of the flip-flop element 608p is at high level, as illustrated in FIG. 12 at (c). Consequently, the analogue switch 615 is in the conducting state so long as the output of the OR gate element 611R and hence the output of the flip-flop 608p is at high level, as the result of which the output waveform of the full-wave rectifier circuit 614 is transmitted through the analogue switch 615 so long as the output signal of the flip-flop element 608p makes appearance. The output of the flip-flop element 608m is at high level even when the signal of negative polarity is detected at an earlier time point than the signal of positive polarity, allowing thus the signal indicative of intensity of the echo to be outputted from the analogue switch element 615. It should however be mentioned that the analogue switch element 615 is enabled (i.e. made conductive) only when either the flip-flop element 608p or 608m is operated. The information of phase of the echo is derived by way of the adder 611, as in the case of the first and second embodiments. As will now be appreciated, in the case of the instant embodiment, the phase discriminating information indicating which of the positive polarity signal or the negative polarity signal makes appearance earlier is derived from the output of the adder 611, while the signal representative of echo intensity can be obtained from the output of the analogue switch 615. By making use of the information of echo intensity available through the analogue switch element 615, it is possible to shade correspondingly the image produced on the display unit in dependence on the high and low intensities of the echo. Further, the signals of positive and negative polarities can be displayed in different colors so that they can be readily discriminated from each other. In the instant embodiment, the unipolar signal is obtained by using the full-wave rectifier circuit 614. This is based on the assumption that the processing unit 7 can deal with only the unipolar signal. Accordingly, in case the processing unit 7 is capable of accepting and processing the bipolar signal, the full-wave rectifier circuit 614 can be spared, wherein the output signal of the sampling circuit 603 may be directly applied to the processing unit 7.

Figure 13:
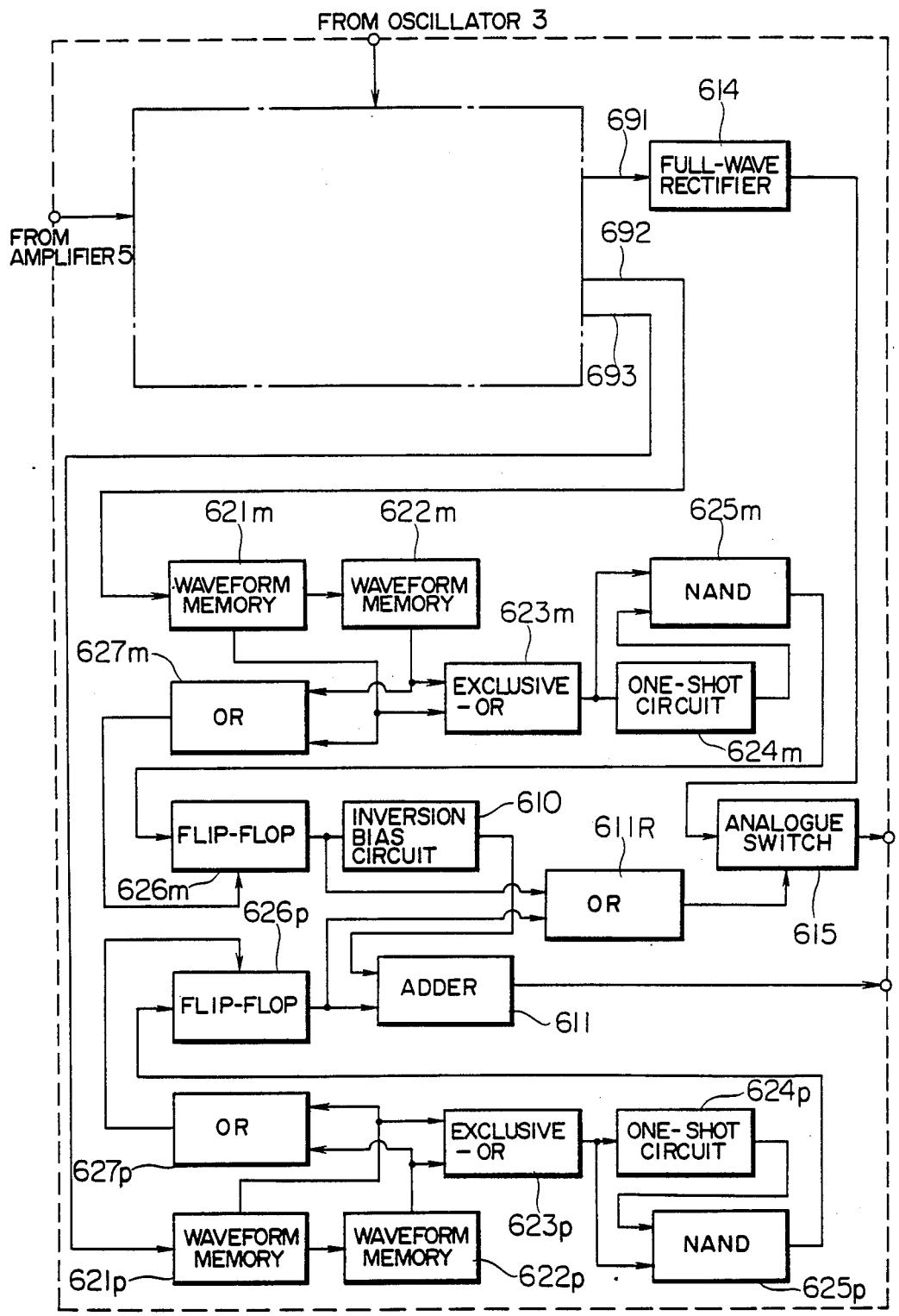
FIG. 13 is a block diagram showing a circuit arrangement of a phase discriminator according to a fourth embodiment of the present invention.
Figure 14:
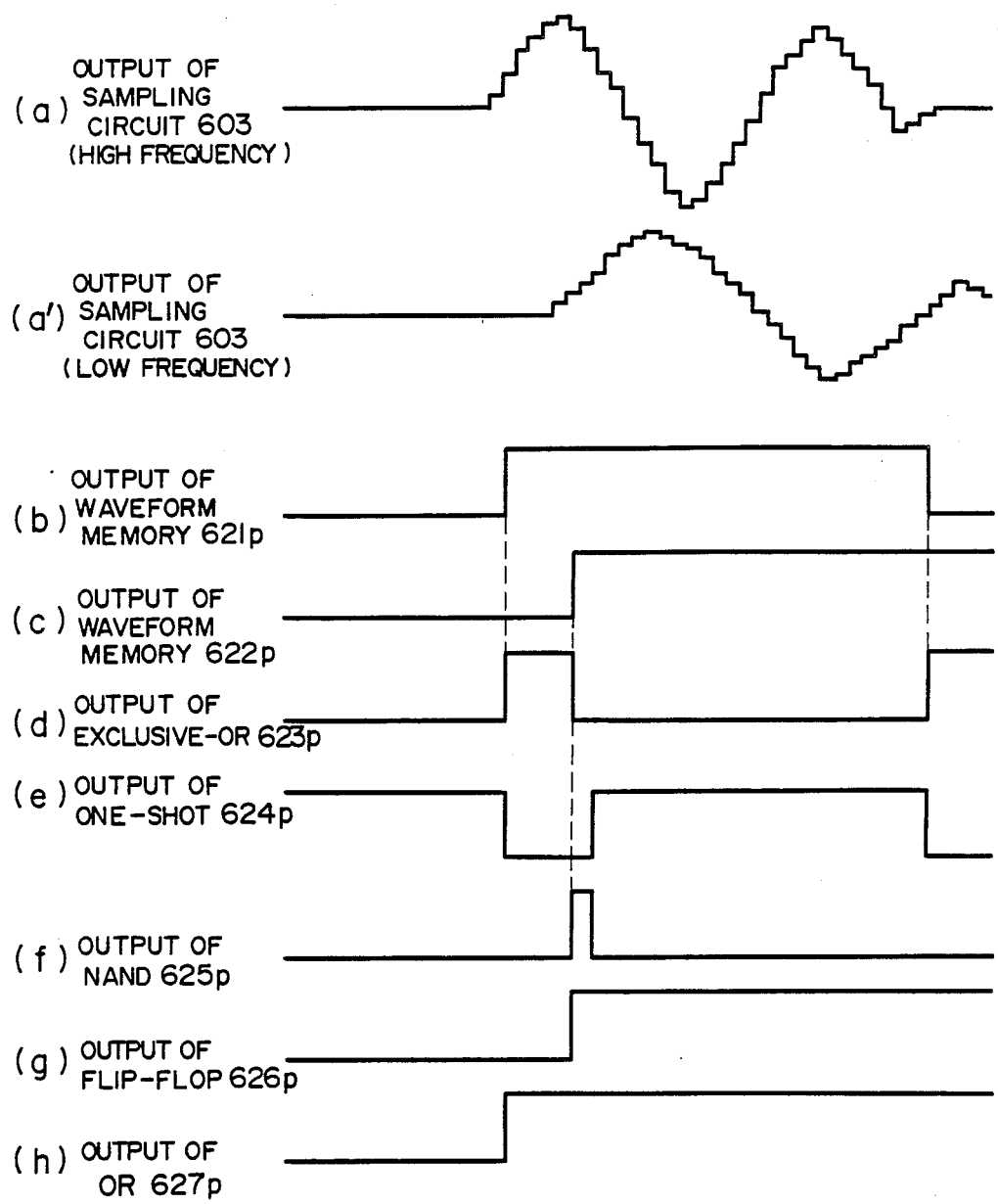
FIG. 14 is a diagram illustrating waveforms of signals produced by circuits consituting parts of the phase discriminator shown in FIG. 13.

FIG. 13 shows an arrangement of the phase discriminator 6 according to a fourth embodiment of the present invention. This phase discriminator is characterized in that the oscillation frequency of the oscillator is varied so that echo signals of different frequencies are received for mutual comparison thereof. Description of the phase discriminator according to the fourth embodiment will be made below with emphasis put on the difference from the phase discriminator according to the third embodiment described above. Referring to FIG. 13, the circuit portion shown as enclosed by a single-dot line is of a same configuration as the corresponding circuitry of the phase discriminator shown in FIG. 11, wherein the output lines designated by 691, 692 and 693 correspond to the outputs of the sampling circuit 603 and the flip-flop elements 608m and 608p, respectively. Reference numerals 621m and 621p denote waveform memories, respectively. Similarly, numerals 622m and 622p denote waveform memories, respectively. These memories serve to store the output signals of the flip-flop elements 608m and 608p, as described hereinafter. A distinct feature of the phase discriminator according to the fourth embodiment resides in that radio wave of a first frequency is radiated and the corresponding echo is sampled and stored in one waveform memory array, which is followed by radiation of radio wave of a second frequency differing from the first, wherein the corresponding echo is sampled similarly and stored in the other waveform memory array. Both the echo signals stored in this manner are then compared with each other in respect to phase thereof. More specifically, the echo of the first frequency can be stored in the waveform memories 621m and 622m with the echo of the second frequency being stored in the waveform memories 621p and 622p, by way of example. Referring to FIG. 14, there are illustrated the output signals of the sampling circuit 603 for the oscillation output of the different frequencies together with the output signals of the waveform memories 621p and 622p. In the case of the instant embodiment, it is assumed that the signal of positive polarity is detected chronographically in precedence to the signal of negative polarity. Accordingly, the outputs of the waveform memories 621m and 622m remain constant at low level. In FIG. 13, reference letters 623m and 623p denote Exclusive-OR gate elements. The output waveform of the Exclusive-OR element 623p is, for example, such as shown in FIG. 14 at (d). Further, 624m and 624p denote one-shot circuits, respectively. The output of the one-shot circuit varies from a high level of a predetermined width or duration to a low level in response to the output of the associated Exclusive-OR element 623m or 623p, as shown in FIG. 14 at (e). The width of the output of the one-shot circuit 624m or 624p indicates the phase lag in the detected signal. Reference letters 625m and 625p denote NAND elements, respectively. The outputs of the Exclusive OR element 623m and the one-shot circuit 624m are logically NANDed by NAND gate 625m, while the outputs of the Exclusive-OR element 623p and the one-shot circuit 624p are logically NANDed by the NAND gate 625p. In the case of the illustrated example, the NAND element 625p produces the output waveform shown in FIG. 14 at (f). The output pulse of the NAND element or gate 625p serves as the set pulse for the flip-flop element 626p. Similarly, the output pulse of the NAND element 625m serves as the set pulse for the flip-flop element 626m. The reset signals for the flip-flop elements 626p and 626m are constituted by negative going edges of the output signals of the OR gates 627p and 627m, respectively. As is shown in FIG. 14 at (h), the output of the OR element 627p is a logical product of the outputs of the waveform memories 621p and 622p. The output signal of the flip-flop element 626m is inverted by the inverting/biasing circuit 610 and added with the output of flip-flop 626p through the adder 611. The output of the adder 611 contains phase information and is supplied to the processing unit 7 as the output of the phase discriminator 6. On the other hand, the output of the OR element 611R is utilized for controlling the analogue switch 615 in such a manner in which the output signal of the full-wave rectifier circuit 614 makes appearance when the output of the OR element 611R is at high level. The output signal of the analogue switch 615 contains echo intensity information. The foregoing description has been made on the assumption that the output of the Exclusive-OR element 623p has a width narrower than that of the output of the one-shot circuit 624p. Next, consideration will be made on the case in which the output width of the Exclusive-OR element 623p is greater than that of the one-shot circuit 624p. In that case, there exists no period during which both the outputs of the Exclusive-OR gate 623p and the one-shot circuit 624p are simultaneously at low level, as the result of which the output of the NAND element 626p remains constant at low level. Consequently, the set signal for the flip-flop element 626p is not produced. Thus, neither the adder 611 nor the analogue switch element 615 produces output signal. In this way, by adjusting the time duration of the one-shot element 624p, it is possible to determine whether the phase difference between both the oscillation frequencies corresponding to said time duration lies within a preset time range or duration. When the phase difference falls within the preset time duration, information of phase and intensity of the echo can be obtained. On the contrary, in case the phase difference is greater than the preset time duration, neither the phase information nor the intensity information of echo are available. Accordingly, provided that amounts of phase deviations between the incident waves and echoes of different frequencies for a variety of materials, it is possible to detect only the echo from a target object of a specific material by setting the phase deviation corresponding to that specific material as the preset time duration mentioned above. For example, in the case of a buried object of a metal exhibiting a high electric conductivity, the frequency dependency of phase of the echo is not remarkable over a wide frequency range of several tens MHz to several GHz. Accordingly, by setting a narrow width of the pulse output of the one-shot circuit 624, it is possible to detect only the echo reflected by a metal object and display the image thereof, since the phase of the echo from rocks, gas cavities or the like which exhibits a significant frequency dependency over a width frequency range can be then eliminated.

In the foregoing, embodiments of the phase discrimination have been described in detail. By virtue of the structures of the phase discriminator, the phase information indicating which of the positive polarity signal or the negative polarity signal is detected at first can be derived together with the echo intensity information. Both information is supplied to the processing unit 7 to be processed so that they can be displayed as the image information.

Figure 15:
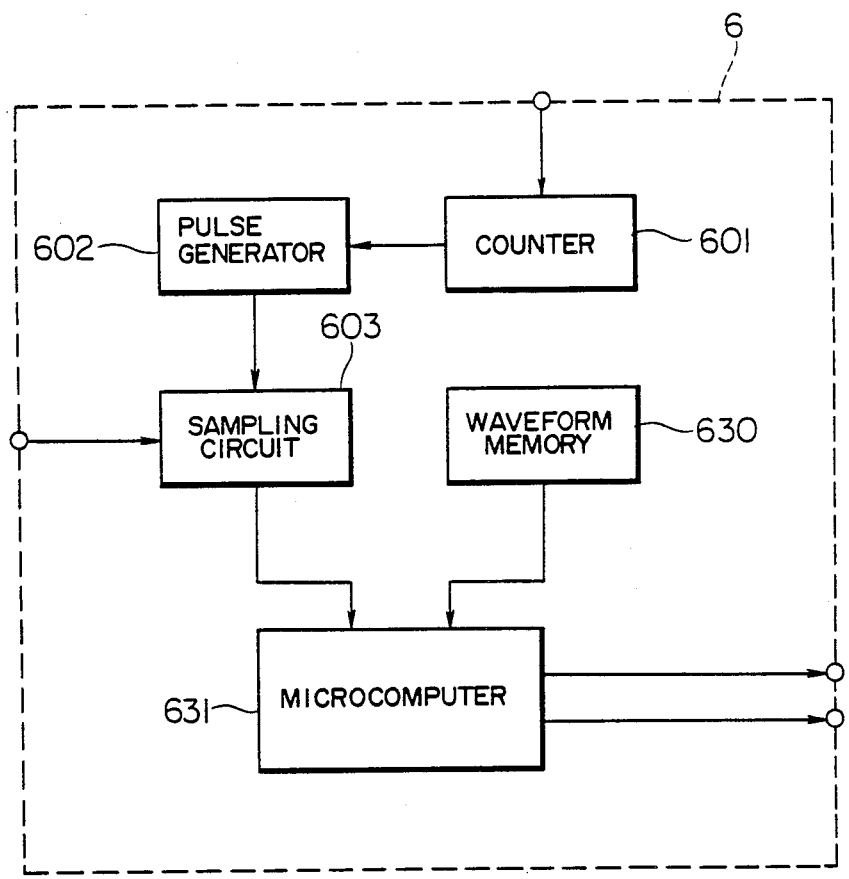
FIG. 15 shows in a block diagram a circuit arrangement of a phase discriminator according to a further embodiment of the invention.
Figure 16:
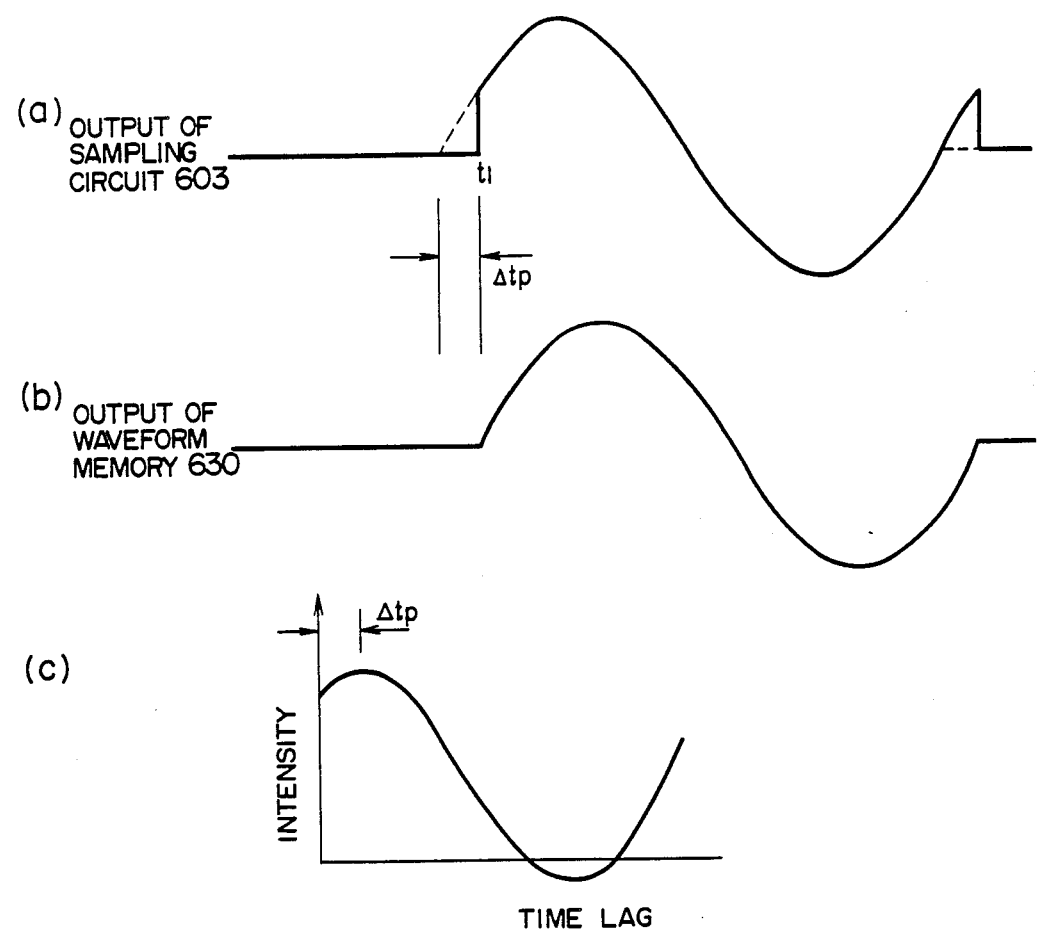
FIG. 16 is a diagram illustrating waveforms of signals produced by circuits constituting the phase discriminator shown in FIG. 15.

Next, a further or fifth embodiment of the phase discriminator 6 according to the invention will be described which differs from the four embodiments described hereinbefore in that not only the phase difference but also the phase angle are determined. More specifically, the phase difference between the incident waveform and the echo waveform is determined on the basis of correlation of both waveforms. FIG. 15 shows a circuit configuration of the phase discriminator 6 according to the instant embodiment, and FIG. 16 shows signal waveforms produced by the sampling circuit and the waveform memory constituting parts of the discriminator. Referring to FIG. 15, the counter circuit 601, the pulse generator circuit 602 and the sampling circuit 603 are same as those described hereinbefore. A numeral 630 denotes a waveform memory for storing previously the waveform of the signal applied to the antenna 2, and 631 denotes a processor unit consituted by a microcomputer. The waveform produced by the sampling circuit 603 starts at a time point $t_1$ as shown in FIG. 16 at (a). In other words, the sampling operation is initiated starting from the time point $t_1$ which is delayed in phase by an amount $\Delta t p$. By determining $\Delta t p$, it is possible to get information about the phase difference between the incident waveform and the echo waveform. To this end, the processor 631 creates a sinusoidal waveform having an amplitude varying starting from zero, through extrapolation of the output signal waveform of the sampling circuit 603. Since the waveform memory 630 has previously stored therein the radiated waveform, the incident waveform rising up from the time point $t_1$ can be obtained from the waveform memory by reading out the stored waveform at the time point $t_1$ at which the echo is detected. Subsequently, correlation between the sinusoidal waveform obtained through the extrapolation and the waveform starting from the time point $t_1$ is arithmetically determined. This calculation can be realized by using a known arithmetic operation unit in which Fourier transformation, for example, is made use of. The result of the arithmetic correlation as performed is shown in FIG. 16 at (c). It will be seen that a peak is produced at a time deviated by $\Delta tp$. This deviation can be regared as the time difference. On the basis of this deviation $\Delta tp$, the phase can be determined because the frequency of the incident wave is known. In the case of the instant embodiment, the arithmetic correlation is adopted for suppressing the influence of noise. When noise is negligible as in the case of the example shown in FIG. 16, deviation $\Delta tp$ can be determined by determining the intersection of the output waveform of the sampling circuit 603 with the amplitude level of zero through extrapolation according to a version of the instant embodiment. Further, by changing the phase of the incident waveform upon every radiation or transmission of the radio wave, it is possible to determine the phase difference between the incident waveform and the echo according to another version of the instant embodiment.

Next, description will be made on the method of displaying the waveform and phase of the echo received by the radar as well as the image of the reflecting object.

Figure 17:
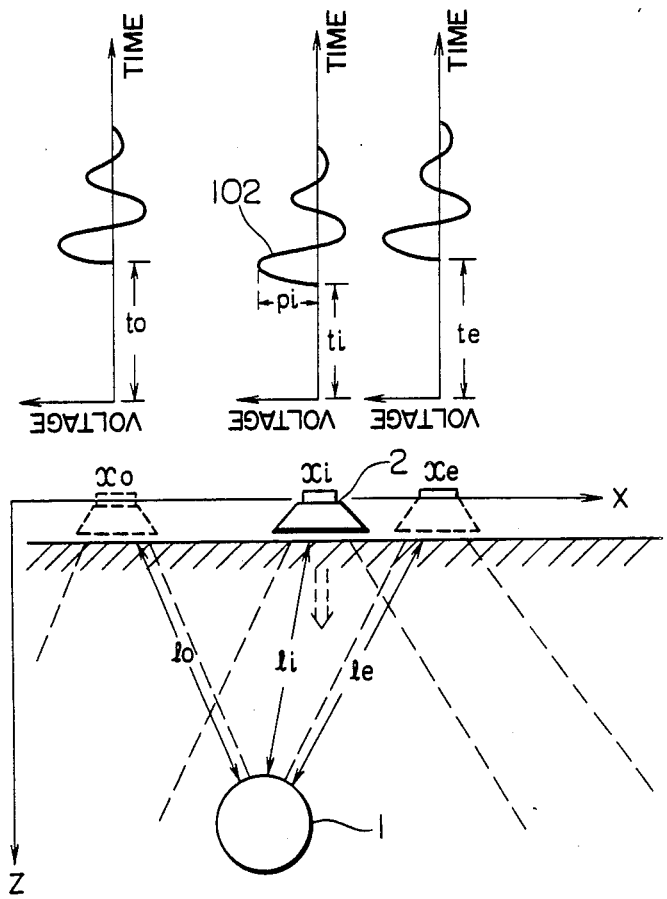
FIG. 17 is a view for illustrating positional relationships among a buried object, locations of antenna and waveforms of detected echo.

Referring to FIG. 17, when a buried object, i.e. the reflecting object is scanned by the antenna 2, the echo waveforms obtained at respective scanning positions of the antenna are such as shown in the upper half portion of FIG. 17. Since the radio wave emitted from the antenna 2 propagates in divergence, the echo from the reflecting buried object 1 can be received within a range of the scanning positions of antenna $x_0$ to $x_e$. At the scanning position $x_i$, the distance from the antenna to the shell of the buried object is represented by $l_1$. When the waveform 102 of the echo received at the scanning position $x_1$ in a coordinate system where voltage is taken along the ordinate while the time lapse from the time point at which the radio wave was radiated is taken along the abscissa, the time point $t_i$ at which the waveform 102 rises up is represented as a function of the distance $l_i$ between the buried object 1 and the antenna 2 as follows:

$$t_i = 2 l_i / C \quad (14)$$

where C represents velocity of propagation of the radio wave.

Figure 18:
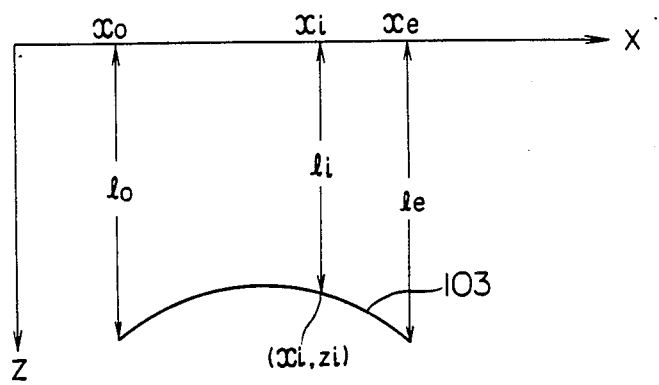
FIG. 18 is a view for illustrating a plotting procedure fdr producing a visually observed image of a buried object to be detected.

For displaying the image of the buried object 1 starting from the rise-up time point $t_i$ of the echo received by the antenna 2, the coordinates $(X_i, Z_i)$ of the reflecting buried object 1 are determined in accordance with the following expression by neglecting divergence of the radio wave emitted from the antenna 2, i.e. by assuming that the radio wave propagates in the direction parallel to the Z-axis, to thereby plot the image 103 of the buried object 1 shown in FIG. 18.

$$Z_i = l_i = C t_i / 2 \quad (15)$$

The image 103 plotted on the basis of the coordinates $(x_i, Z_i)$ of the reflecting point determined in accordance with the expression (15) will differ remarkably from the contour of the buried object 1, because of magnification in the x- and Z-directions due to divergence of the propagating radio wave.

Accordingly, for displaying the image of the reflecting surface corresponding to the real contour of the buried object 1, divergence of propagation of the radio wave must be taken into consideration. In the following, a displaying method which meets this requirement will be described by referring to FIGS. 19 to 20 (d).

Figure 19:
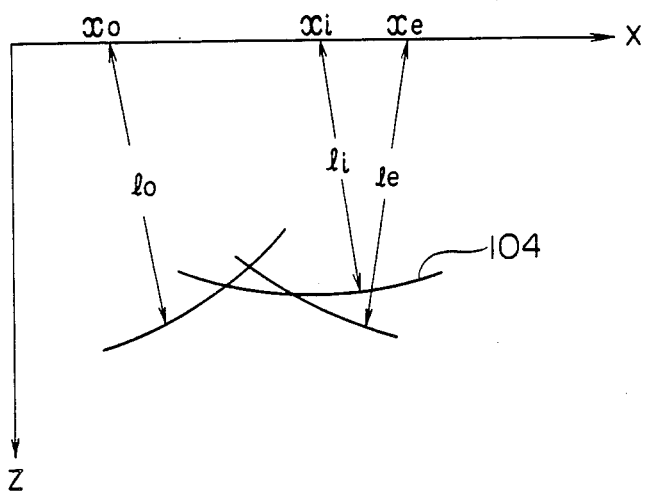
FIG. 19 is a schematic view illustrating of procedure for obtaining an image corresponding to a form of a buried object.
Figure 20:
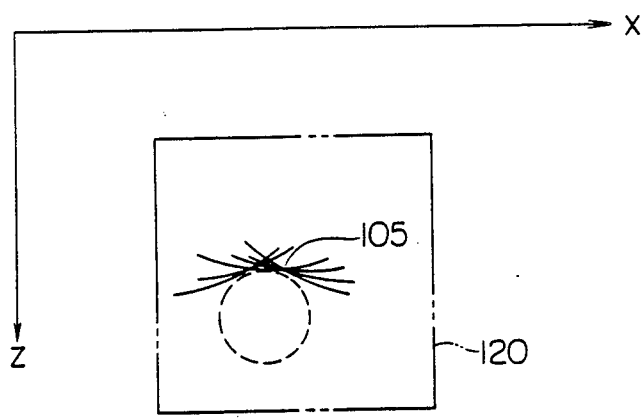
FIG. 20 is a view showing an example of a display produced through the procedure illustrated in FIG. 19.
Figure 20A:
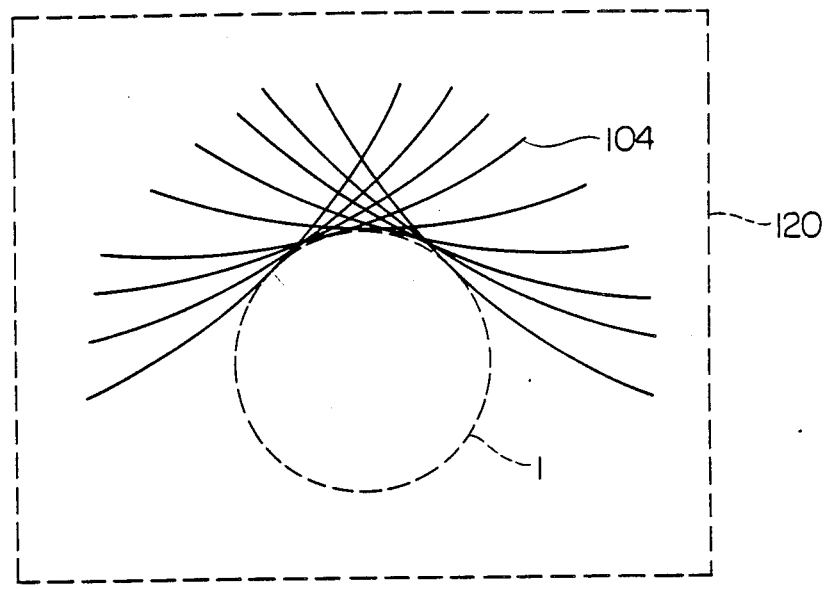
Figure 20B:
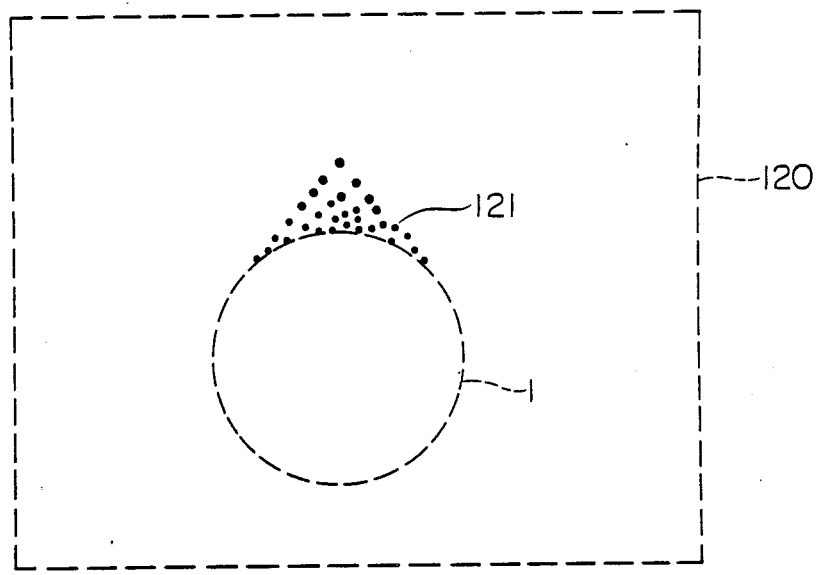
Figure 20C:
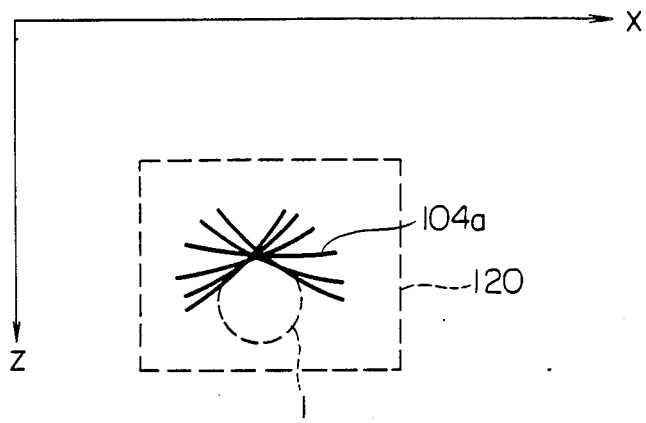
Figure 20D:
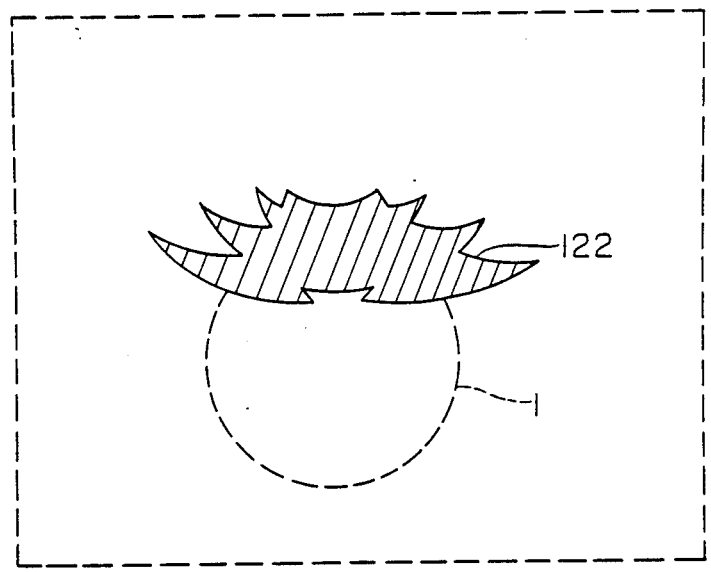

Referring to FIG. 19, a circular arc 104 having a radius $l_i$ is plotted about the scanning position $x_i$ on a X-Z plane. The arc 104 has a length corresponding to coverage of the radio wave radiated from the scanning position $x_i$. The reception of the echo at a time point $t_i$ means that the position of reflection is located on the circular arc 104, in view of the expression (14). In the similar manner, circular arcs are plotted about the respective scanning positions $x_0$ to $x_e$, whereby an image 105 conforming to the outer surface of the buried object 1 can be obtained, as shown in FIG. 20. However, through the procedure mentioned above, extra arcs irrelevant to the outer profile of the buried object 1 will be produced. Accordingly, in order to obtain a clearer image of the buried object, procedures mentioned below can be adopted.

FIG. 20 (a) is a view corresponding to FIG. 20 and shows on an enlarged scale the image within the frame 120. Although the arcs 104 are tangential to the outer contour of a buried object, it is impossible to plot clearly the outer contour of the buried object 1 if the line width or thickness of the arcs 104 is excessively small. In this connection, it may be considered that the region where the arcs 104 are superposed or intersect one another is the location where the reflecting object is present with the maximum probability. FIG. 20 (b) shows extractively only the positions where the arcs 104 intersect one another. Each of the points 121 represents a position where two arcs 104 intersect each other. As the line width of the arc becomes smaller, the number of the positions where a plurality of the arcs intersect one another is decreased, resulting in that distribution of the intersecting points constitutes an image which is correspondingly reduced in the similarity to the outer contour of the buried object 1. Under the circumstance, let's examine what result can be obtained when the line width of the arc is increased. FIG. 20 (c) shows an image where the arcs 104a are plotted by bold lines. Further, FIG. 20 (d) shows an image having a shape indicated by a hatched area, which image is depicted in accordance with distribution of points where the arcs 104a intersect one another many times. More specifically, the image 122 represents the regions in which intersections of four or more arcs 104a occur. By increasing the line width of the arc, an intersection of the arcs makes appearance in the form of an area instead of a point. However, the image created by those areas can not accurately represent the outer contour of the buried object 1. In the following, description will be made of a method of reproducing the outer contour of the buried object 1 with a high accuracy by using a distribution of intersections formed by bold arc.

At first, when the propagation time $t_i$ is determined, an arc is depicted about the scanning position $x_i$ (i.e. the center of curvature of the arc) with a radius $l_i$ where $l_i = Ct_i/2$. This arc is considered as a wave front. Assuming that the error involved in the measurement of the propagation time $t_i$ is represented by $\Delta t$, an arc is plotted with a intensity "1" in a radial range of $l_i$ to $(l_i + 2\Delta l)$, where $\Delta l = C\Delta t/8$), while in a radial range from $(l_i + 2\Delta l)$ to $(l_i + 4\Delta l)$ an arc is depicted with a intensity of $-1$. In the radial range from $l_i$ to $(l_i + \Delta l)$ and from $(l_i + 3\Delta l)$ to $(l_i + 4\Delta l)$, an arc is plotted with a intensity of $1j$ (where j represents an imaginary unit). In a radial range from $(l_i + \Delta l)$ to $(l_i + 3\Delta l)$, an arc is plotted with a intensity of $-1j$. In other words, when the time $t_i$ of propagation is obtained, this means that the reflecting object exists in a region defined by the radial distance $l_i$ and $(l_i + 4\Delta l)$ from the scanning position $x_i$ and the angle $\theta$. Representation of the intensity applied to a given arc by a real number and an imaginary number is equivalent to representation in terms of probability distribution in the same coordinate system, since the real number representation is out of phase with the imaginary number representation by 90°. In the following, the image displaying method will be described more particularly.

Figure 21:
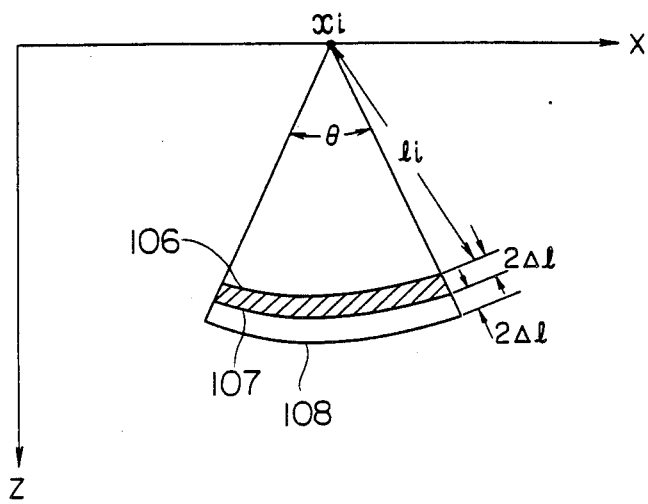
FIG. 21 is a view for illustrating a method of displaying clearly an image of an object under investigation according to a still further embodiment of the invention.

Referring to FIG. 21, it is assumed that display screen is constituted by a X-Z plane. About the center or scanning position $x_i$, arcs 106, 107 and 108 are plotted with radii of $l_i$, $l_i + 2\Delta l$ and $l_i + 4\Delta l$, respectively, within an angle $\theta$. Value of pixels (i.e. picture elements) located in a hatched area defined between the arcs 106 and 107 correspond to the maximum amplitude $P_i$ of the echo shown in FIG. 15. The value of the pixels located in the area enclosed by the arcs 107 and 108 is represented by $-P_i$. Through similar procedure, arcs are plotted at the scanning position, wherein the pixels located in the areas enclosed by the arcs are added with the values $P_i$ and $-P_i$ in the manner described above. More specifically, arcs 109, 110 and 108 are plotted with radii $l_i$, $(l_i + \Delta l)$, $(l_i + 3\Delta l)$ and $(l_i + 4\Delta l)$ about the scanning position $x_i$ within the angular range defined by the angle $\theta$. Pixels in the regions between the arcs 106 and 109 and between the arcs 110 and 108 is added with the value $-P_i$, while the pixels located in the hatched area defined between the arcs 109 and 110 are added with the value $P_i$. The same procedure is repeated for each of the scanning positions.

Figure 22:
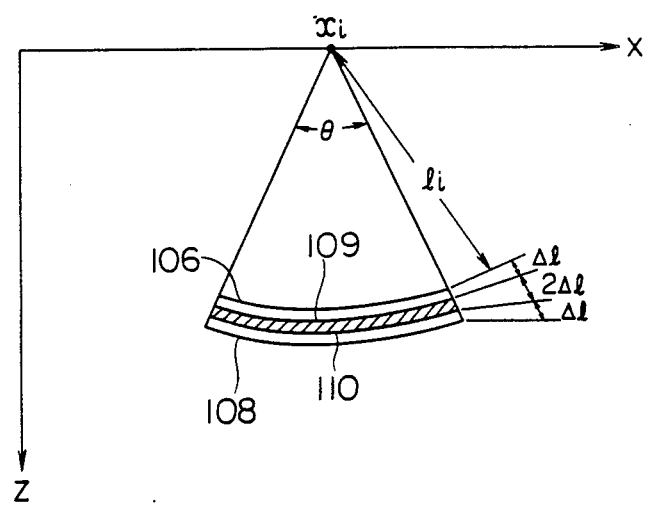
FIG. 22 is a view for illustrating the concept of a numeral value adding procedure adopted in the method illustrated in FIG. 21.

Upon completion of the value adding procedure described above and illustrated in FIGS. 21 and 22 for all of the scanning positions, integrated intensity Pw is calculated for the pixel value P5 (X, Z) shown in FIG. 21 and the pixel value P6 (X, Z) shown in FIG. 22 in accordance with the following expression:

$$P_w(X, Z) = P_5(X, Z)^2 + P_6(X, Z)^2 \quad (16)$$

By displaying only those pixels for which Pw(X, Z) is greater than a predetermined standard value, there can be obtained an image 111 which follows the outer contour of the buried object 1 with a high fidelity. In this manner, through the procedure illustrated in FIGS. 21 and 22 as well as the arithmetic determination of the integrated intensity, a clear and sharp image following the contour of the buried object with an improved fidelity can be produced. It should be added that when +1 and −1 are selected for the values $P_i$, $-P_i$ added to the pixels in carrying out the procedure illustrated in FIGS. 21 and 22, a detailed image 111 can be displayed although smoothness of the image is injured only slightly.

Figure 23:
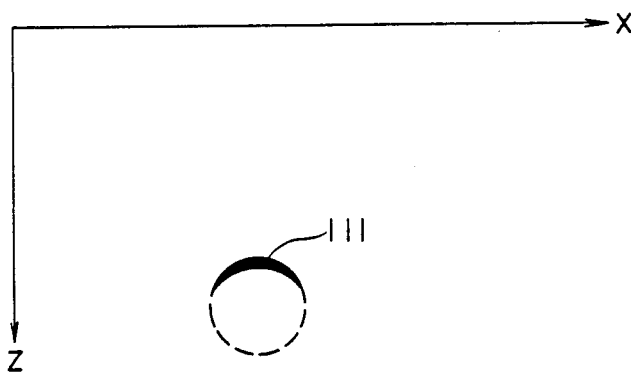
FIG. 23 is a view illustrating an example of a displayed image of a buried object, as generated according to the teaching of the invention.

As described hereinbefore, the phase of the echo varies in dependence on the material of the buried object 1. Next, means for displaying the buried object with discrimination of the material will be described. Referring to FIG. 23, when an image 111 of a buried object is to be displayed, there are provided a plotting system in which the received echo of positive phase is utilized and another plotting system where the received echo of opposite phase is make use of, wherein the integrated intensity Pw (X, Z) of the pixels resulted from the plotting based on the echo of positive phase is displayed in green, for example, while the integrated intensity (X, Z) of the pixels resulted from the plotting based on the echo of opposite phase is displayed in red. In this manner, a reflecting object of a material which brings about change in phase of the echo can be visualized in different colors.

In the following, an exemplary embodiment of an image processor capable of displaying an image of a reflecting object in different colors will be described by referring to FIGS. 24 to 28. In the figures, a peak detector 700 and a time measuring circuit 701 are supplied with the echo signal of waveform shown in FIG. 5 at (f) from the phase discriminator 6, whereby the peak $P_i$ and the time $t_i$ are detected to be outputted. Relation between the peak $P_i$ and the time $t_i$ is illustrated in FIG. 25. One-dimensional memories 702 and 702a store, respectively, one-dimensional data illustrated in FIG. 26 on the basis of the peak $P_i$ and the time $t_i$. A coordinate calculation unit 703 is supplied with the data of the scanning position $x_i$ and the address data 1 of the one-dimensional memory 702a to calculate two-dimensional addresses X′ and Z′ in accordance with the following expression:

$$\left. \begin{array}{l} X' = l\sin\beta + x_i \\ Z' = l\cos\beta \end{array} \right\} \quad (17)$$

From the calculation in accordance with the expression (17), the two-dimensional coordinates of the arcs having the center of curvature at the scanning position $x_i$, the radii l and angle $\theta$ of divergence are determined.

Two-dimensional pixel memories 706 and 706b store, respectively, $P_{50}(X', Z')$ and $P_{51}(X', Z')$, while pixel memories 706a and 706c store, respectively, $P_{60}(X', Z')$ and $P_{61}(X', Z')$. Each of the pixel memories is supplied with the address (X′, Z′) from the coordinate calculation unit 703, resulting in that data $P_{50}$, $P_{60}$, $P_{51}$ and $P_{61}$ corresponding to the address 2 are outputted to selectors 705 and 705a. The selector 705 gates $P_{50}$ to the adder 704 when the phase signal is positive, while gating $P_{60}$ to the adder 704 when the phase signal is negative. Similarly, the selector 705a supplies $P_{51}$ to the adder 704a when the phase signal is positive, while supplyin $P_{61}$ to the adder 704a for the negative phase signal. In the adders 704 and 704a, the values applied through the selectors 705 and 705a are added with the address values 1 of the memories 702 and 702a, respectively, the results of additions being stored through the selectors 705 and 705a in the respective pixel memories at the coordinates (X′, Z′). An intensity calculation unit 707 calculates intensity on the basis of the contents $P_{50}(X', Z')$ and $P_{51}(X', Z')$ stored in the pixel memories 706 and 706b in accordance with $$P_{w5}(X', Z') = P_{50}(X', Z')^2 + P_{51}(X', Z')^2 \quad (18)$$

wherein the result $P_{w5}(X', Z')$ is stored in the image memory 708. It should be mentioned that $P_{w5}(X', Z')$ smaller than a reference value $P_{th}$ is set to zero. The reference value $P_{th}$ is set by a setting circuit 710 and supplied to the intensity calculation units 707 and 707a.

Similarly, the intensity calculation unit 707a calculates $P_{w6}$ on the basis of the contents $P_{60}$ and $P_{61}$ of the pixel memories 706a and 706c in accordance with $$P_{w6}(X', Z') = P_{60}(X', Z')^2 + P_{61}(X', Z')^2 \qquad (19)$$

wherein the results of the calculation are placed in the image memory 708a. When $P_{w6}$ is smaller than the reference value $P_{th}$, the former is zeroed. A scan converter 709 scans the addresses $(X', Z')$ of the memories 708 and 708a to output the contents $P_{w5}(X', Z')$ as a red luminance signal and the contents $P_{w6}(X', Z')$ as a green luminance signal. Simultaneously, the deflecting signals $X'$ and $Z'$ corresponding to the address $(X', Z')$ are outputted to display the image on the unit 8 in colors.

Figure 24:
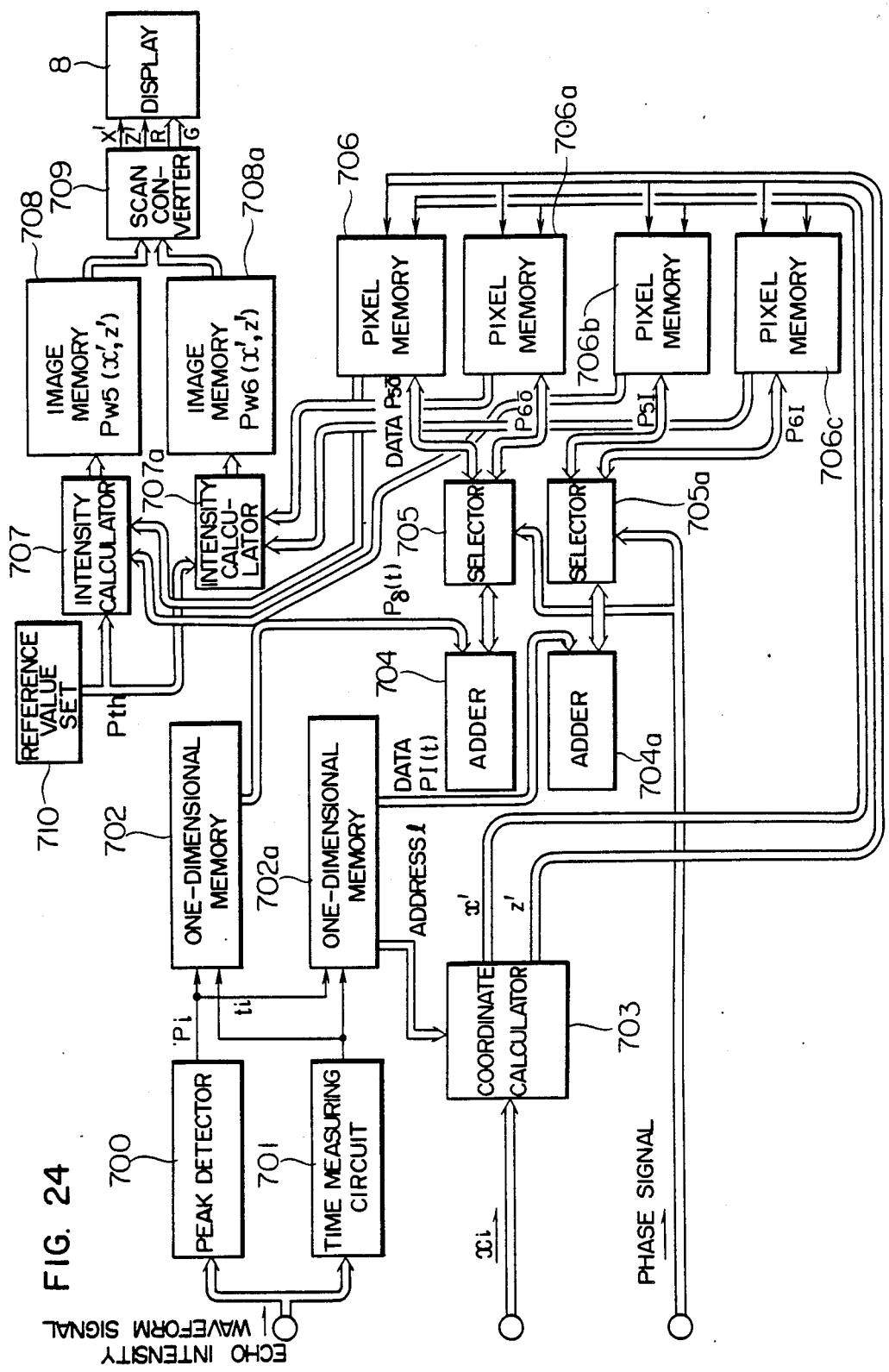
FIG. 24 is a view showing in detail a structure of a processor which can be employed in the apparatus shown in FIG. 4.
Figure 25:
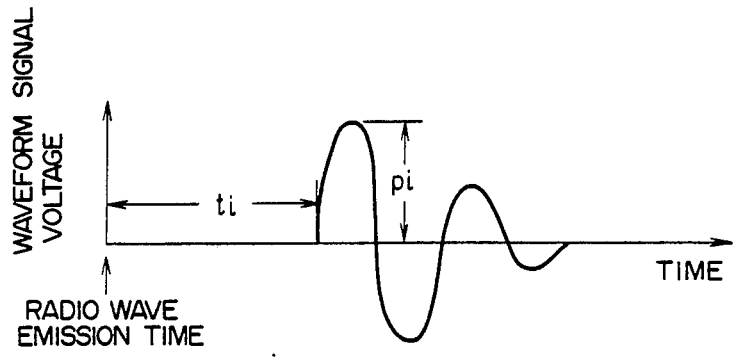
FIG. 25 is a view illustrating a detection time and peak value which are made use of in the processor shown in FIG. 24.
Figure 26:
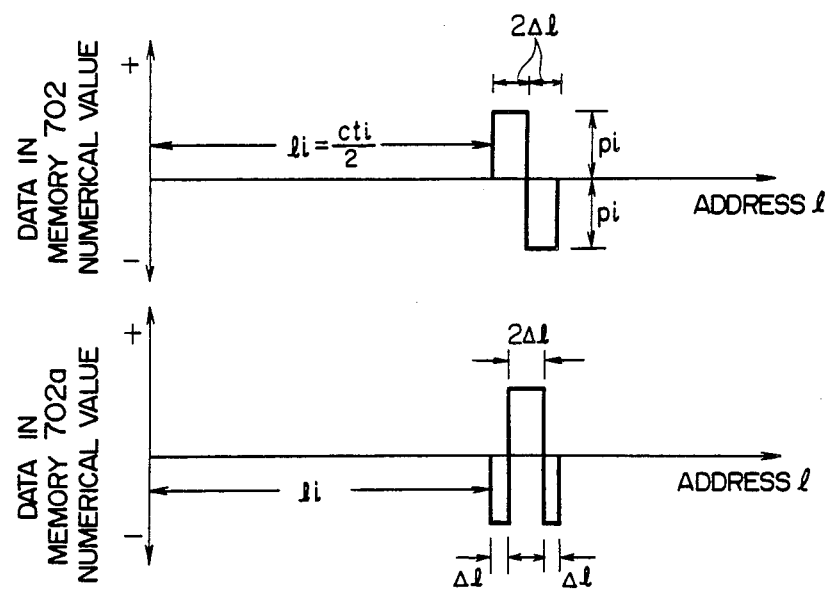
FIG. 26 is a view showing storage of one-dimensional data in memories.
Figure 27:
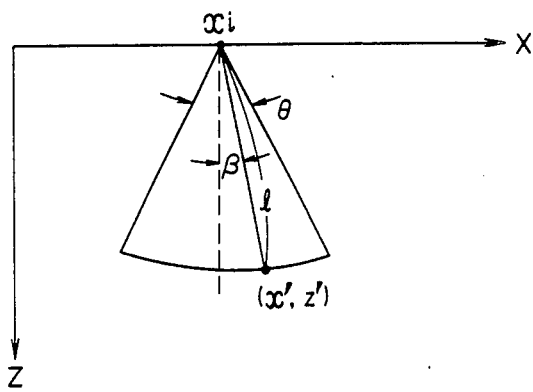
FIG. 27 is a view for illustrating a two-dimensional coordinate system for visualization of a detected object.
Figure 28:
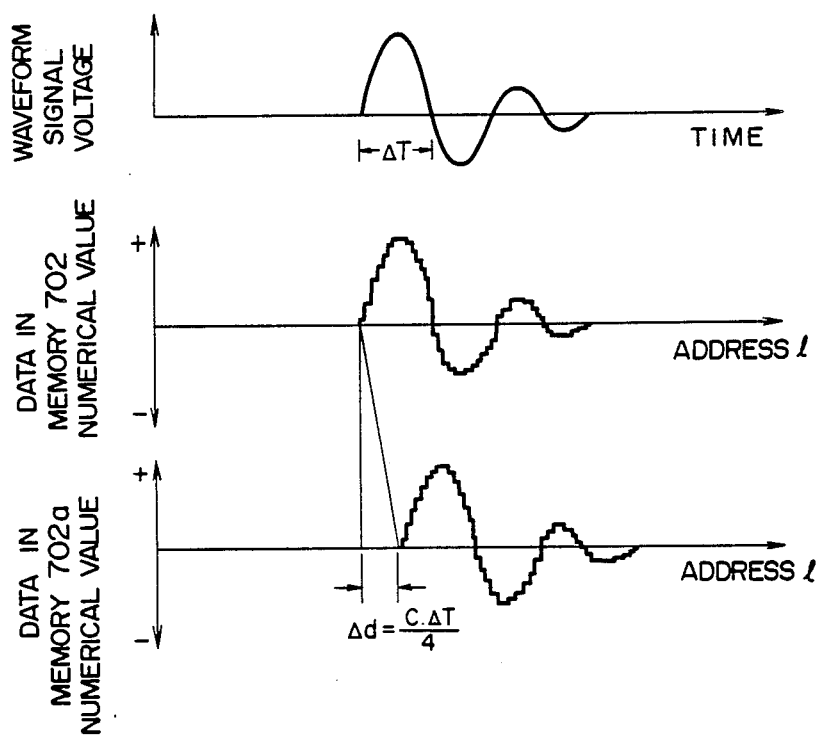
FIG. 28 is a view illustrating contents of one-dimensional memories.

In connection with the structure shown in FIG. 24, it should be mentioned that the peak detector 700 and the time measuring circuit 701 may be omitted, wherein the waveform signals are stored in the one-dimensional memories 702 and 702a for performing the aforementioned procedure. In that case, the one-dimensional memories store therein the numeral values illustrated in FIG. 28.

As will now be appreciated, it is possible to display in detail the image of a buried object by processing the echo signals through the procedures disclosed herein even when the radio wave is diverged. Further, the image corresponding to the echo of positive phase and the image corresponding to the negative phase can be displayed in different colors such as red and green, respectively. As the result, the shape or outer contour of a target object can be recognized precisely from the sharp image, while types of the buried object such as an iron tube, earthen pipe, rocks, power transmission cable or the like can be easily identified.

As will be appreciated from the foregoing description, the invention makes use of the phenomenon that the phase of the echo resulted from radiation of a radio wave to an object in concern differs in dependence on the material of the object. According to a feature of the invention, the image of the object under investigation can be displayed in color in dependence on the phase and intensity of echo on the basis of both the position information and the intensity information derived from the echo signal. It is thus possible to identify discriminatively the materials of the object in terms of different colors. Further, the location of the object can be identified on the basis of the position at which the image thereof is displayed. Besides, a particular one of various objects can be selectively detected, identified and displayed.

Although the invention has been described by taking as example the method of detecting an object buried in the earth, it will be appreciated that the invention can equally be applied to detection of objects in the air or under the water in addition to the underground object.

We claim:

1. A method of detecting of detecting location, shape and material of an object, comprising the steps of:
    radiating a radio wave toward an object;
    receiving an echo wave of said radio wave reflected from said object to detect an intensity of said echo wave;
    comparing a phase of the radiated radio wave with that of said echo wave to detect a phase difference between said radiated wave and said echo wave; and
    displaying on a display unit the location and shape of the object on the basis of the intensity of said echo wave and displaying on said display unit the material of said object on the basis of said phase difference between said radiated wave and said echo wave.

2. A method according to claim 1, wherein a plurality of radio waves having different frequencies are radiated toward the object, and said phase difference is obtained for each of said radio waves of different frequencies.

3. A method according to claim 1, wherein at the step of receiving the echo wave, only the echo is detected tht makes appearance within a predetermined time interval after lapse of a preset time from the transmission of said radio wave.

4. A method according to claim 1, wherein a plurality of radio wave having different phases are radiated toward the object, and said phase difference is obtained for each of said radio waves having different phases.

5. A method according to claim 1, wherein the step of radiating the radio wave toward said object includes a step of transmitting the radio wave from a plurality of positions to receive the echo waves resulting from the radio waves reflected from said object, and said phase difference is a obtained for said echo waves.

6. A method according to claim 1, wherein said step of displaying image includes a step of controlling the display intensity of said display unit in dependence on said phase difference between said echo and said radiated radio wave.

7. A method according to claim 2, wherein the step of displaying includes a step of displaying an image on said display unit when a difference in phase deviation of said echo wave between said radio waves of different frequencies lies within a range of preset values.

8. A method according to claim 1, wherein said step of displaying includes a step of displaying an image in different colors in dependence on phase difference between said radio wave radiated toward said object and said echo wave reflected from said object.

9. A method according to claim 5, wherein said image displaying step includes a first step of arithmetically determining a distance to said object on the basis of the time elapsed from radiation of said radio wave to reception of said echo wave, a second step of plotting a first arc having a radius corresponding to said distance and indicated in correspondence with the intensity of said echo wave; a third step of plotting other arcs on both sides of sid first arc in the radial direction, said other arcs being indicated in correspondence with intensities smaller than the intensity of said echo wave by a predetermined value, and a step of repeating execution of said first to third sub-steps for each of said plural positions by scanning with said radio wave and adding the intensities of the arcs intersecting one another independence on the number of intersections, and a step of displaying as the image on said display unit only those intersections for which the value of said added intensities is greater than a predetermined value.

10. A system for detecting location, shape and material of an object, comprising:
    means for radiating a radio wave toward an object;

means for detecting an echo wave of said radio wave reflected from said object to detect an intensity of said echo wave;

phase difference for comparing a phase of said radiated radio wave with that of said echo wave to detect a phase difference between said radiated wave and said echo wave; and means for displaying on a display unit the location and shape of said object on the basis of the intensity of said echo wave, and for displaying on said display unit the material of said object on the basis of said phase difference between said radiated wave and said echo wave.

11. A system for detecting an object according to claim 10, wherein said phase information extracting means determines whether said echo wave is in positive phase or negative phase relative to said radiated radio wave to thereby supply outputs which differ in dependence on positive and negative phases to said image displaying means.

12. A system for detecting an object according to claim 10, wherein said means for radiating the radio wave toward said object emits a plurality of radio waves of frequences differing from one another, said phase difference means comparing said radio waves of different frequencies with the echo waves having correspondingly different frequencies and producing outuputs to said display unit which outputs differ from each other in dependence on whether differences in phase deviation of said echo waves among said radio waves of different frequencies are within a range of predetermined values.

* * * * *